(12) United States Patent
Kempf

(10) Patent No.: US 8,261,488 B2
(45) Date of Patent: Sep. 11, 2012

(54) PLANT CONTAINER ASSEMBLY AND METHOD

(75) Inventor: Brian J. Kempf, Visalia, CA (US)

(73) Assignee: Brian Kempf, Visalia, CA (US)

( * ) Notice: Subject to any disclaimer, the term of this patent is extended or adjusted under 35 U.S.C. 154(b) by 205 days.

(21) Appl. No.: 12/463,122

(22) Filed: May 8, 2009

(65) Prior Publication Data

US 2009/0277084 A1    Nov. 12, 2009

Related U.S. Application Data

(60) Provisional application No. 61/127,030, filed on May 9, 2008, provisional application No. 61/192,398, filed on Sep. 17, 2008.

(51) Int. Cl.
    *A01G 9/10*    (2006.01)
(52) U.S. Cl. ............................................................ 47/78
(58) Field of Classification Search .................. 47/65.5, 47/65.9, 66.1, 66.3, 73, 78
    See application file for complete search history.

(56) References Cited

U.S. PATENT DOCUMENTS

| | | | |
|---|---|---|---|
| 1,689,017 A * | 10/1928 | Fewkes | 47/78 |
| 2,960,798 A * | 11/1960 | Lindstaedt et al. | 47/73 |
| 3,195,272 A | 7/1965 | Mosher et al. | |
| 4,223,480 A | 9/1980 | Welty | |
| 4,497,132 A | 2/1985 | Whitcomb | |
| 4,510,712 A | 4/1985 | Whitcomb | |
| 4,574,522 A | 3/1986 | Reiger et al. | |
| 4,716,680 A | 1/1988 | Whitcomb | |
| 4,753,037 A | 6/1988 | Whitcomb | |
| 4,939,865 A | 7/1990 | Whitcomb et al. | |
| 5,054,235 A | 10/1991 | Pilz | |
| 5,099,607 A | 3/1992 | Lawton | |
| 5,241,784 A | 9/1993 | Henry | |
| 5,301,465 A * | 4/1994 | Caferro | 47/65.8 |
| 5,339,566 A | 8/1994 | Cormier | |
| 5,557,886 A | 9/1996 | Whitcomb | |
| 5,768,825 A | 6/1998 | Reiger | |
| 5,937,577 A * | 8/1999 | Butler et al. | 47/73 |

(Continued)

FOREIGN PATENT DOCUMENTS

WO    WO 93/03602    3/1993

OTHER PUBLICATIONS

International Search Report dated Nov. 13, 2009 from International Application No. PCT/US2009/043309.

(Continued)

*Primary Examiner* — Frank T Palo
(74) *Attorney, Agent, or Firm* — Beyer Law Group LLP

(57) ABSTRACT

A transplantable plant container assembly is provided for containing a growing medium for a plant that significantly promotes air root pruning. The container assembly includes a container device that includes a sidewall support and a bottom support collectively defining an interior cavity. The sidewall support is comprised of a lattice framework defining a plurality of spaced apertures that extend from an interior wall to an exterior wall thereof. A relatively thin, moisture absorbent liner material is disposed adjacent to the lattice framework. The liner material is sufficiently penetrable to enable root penetration therethrough, by the plant, at the apertures. However, the liner material must also have sufficient structural integrity, when moist, to bound the growing medium and moisture across the spaced apertures of the lattice framework when contained in the interior cavity.

36 Claims, 17 Drawing Sheets

U.S. PATENT DOCUMENTS

| | | | |
|---|---|---|---|
| 6,044,585 | A | 4/2000 | Carruth et al. |
| 6,173,531 | B1 | 1/2001 | Howell |
| 6,202,348 | B1 | 3/2001 | Reiger |
| 6,637,155 | B1 | 10/2003 | Butler et al. |
| 6,862,840 | B1 | 3/2005 | Single |
| 6,904,715 | B1 * | 6/2005 | Lawton .................. 47/66.3 |
| 7,210,266 | B2 | 5/2007 | Henry et al. |
| 1,031,713 | A1 | 7/2012 | Hills |
| 2003/0029080 | A1 | 2/2003 | Busby et al. |
| 2003/0167688 | A1 * | 9/2003 | Atchley et al. .................. 47/73 |
| 2004/0074142 | A1 | 4/2004 | Busby et al. |
| 2004/0200141 | A1 | 10/2004 | Whitcomb |
| 2004/0237389 | A1 | 12/2004 | Whitcomb |
| 2005/0034361 | A1 * | 2/2005 | Single .................. 47/32.7 |
| 2005/0223639 | A1 | 10/2005 | Whitcomb |
| 2009/0241415 | A1 * | 10/2009 | Barghini .................. 47/65.5 |
| 2009/0277084 | A1 * | 11/2009 | Kempf .................. 47/66.3 |
| 2010/0236144 | A1 * | 9/2010 | Lawton .................. 47/65.9 |

OTHER PUBLICATIONS

Written Opinion dated Nov. 13, 2009 from International Application No. PCT/US2009/043309.

Partial International Search Report dated Aug. 24, 2009 from International Application No. PCT/US2009/043309.

European Search Report dated Mar. 30, 2012 from European Application No. 09 743 760.2-1260.

* cited by examiner

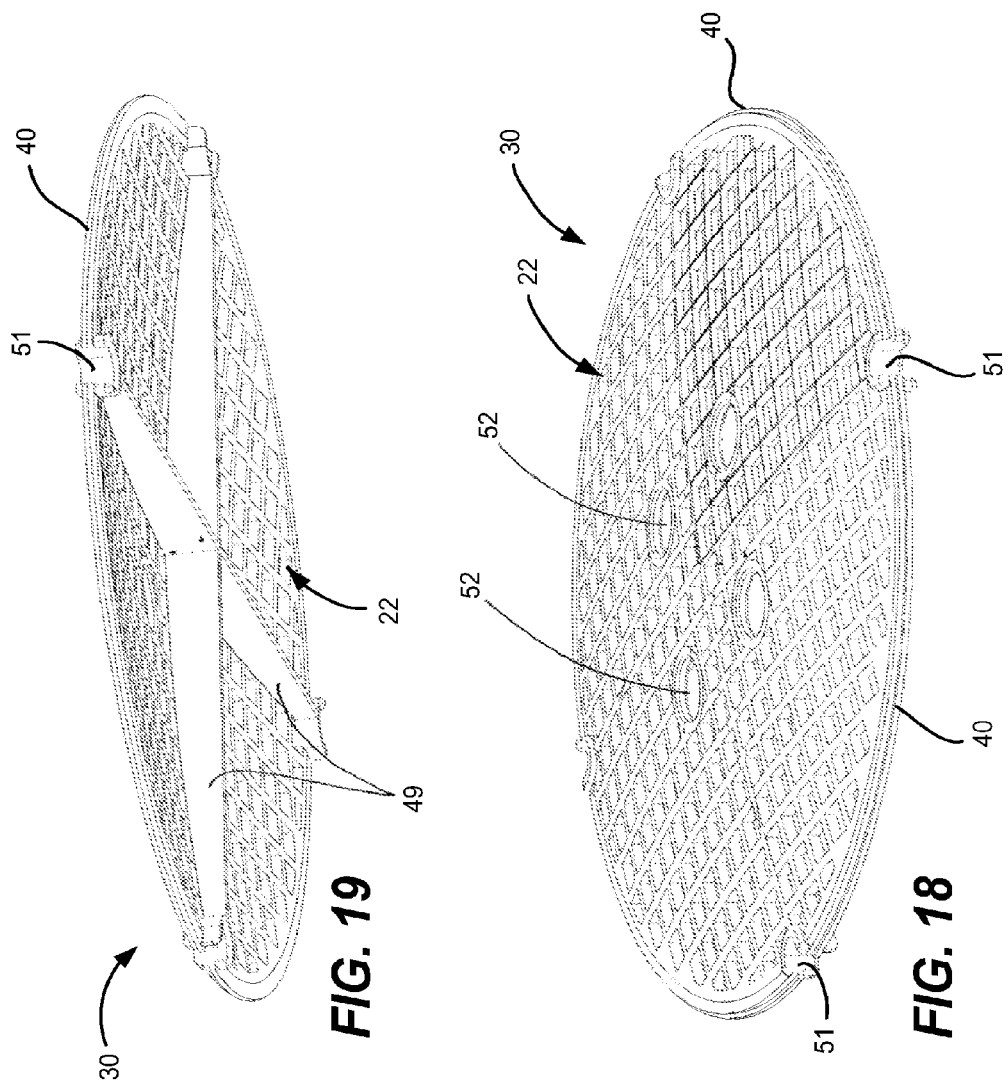

PLANT CONTAINER ASSEMBLY AND METHOD

RELATED APPLICATIONS

This application claims priority under 35 U.S.C. §119(e) from co-pending U.S. Provisional Patent Application No. 61/127,030, filed May 9, 2008, and further claims priority from co-pending U.S. Provisional Patent Application No. 61/192,398, filed Sep. 17, 2008, both entitled "PLANT CONTAINER", and naming Kempf as the inventor, and both of which are incorporated herein by reference in their entirety and for all purposes.

FIELD OF THE INVENTION

The present invention relates generally to containers for growing woody perennial plants. More particularly, the present invention relates to a container base designed to encourage air root pruning on the out side of the container sidewall in order to develop a fibrous root system, prevent stem girdling, and prevent circling and/or root defects from developing at the container sidewall and/or bottom.

BACKGROUND OF THE INVENTION

Currently, the majority of the nursery grown landscape plants, such as trees and shrubs, are initially grown in conventional smooth-wall, non-porous containers made of plastic, steel or other materials. The smooth-wall containers, however, tend to deflect root growth, causing it to then follow along the interior surface of the container, or deflect the root around the sidewall creating a root defect. This often results in root circling and a stem girdling root system. Such containers cause the primary roots to revolve around the container which can cause significant stability problems when the tree matures. Such poor root development and anchorage problems are especially detrimental to trees of the larger variety.

Generally, the roots of a plant grow and extend in a radial fashion from the main stem or trunk. Thus, a root will extend in a naturally promoted direction (i.e., outwardly and downwardly) until it contacts something that it cannot move or penetrate. At that point, the root is deflected in a new direction and extends until it encounters something else that would change its direction of growth or travel. Many seedling woody perennials, in particular, will first develop a tap root that plunges downward. The tap root on some woody perennials will develop a foot of primary root for every inch of top growth. Once the taproot is cut or pruned, the apical dominance of its root tip is lost and the development of some secondary lateral rooting commences. These secondary roots tend to grow a little more horizontally, although generally downwardly, in direction. When these roots run out of room to grow, they begin to circle around the inside of the container. Hence, unless air root pruning is permitted, a phenomenon in which the growth of a root ceases when the root extends into the vicinity of an aperture that is exposed to the atmosphere, these roots will grow to the bottom of the container where they continue to grow in a circular pattern.

Air pruning, hence, is highly desirable, and naturally occurs when roots are exposed to air in the absence of high humidity. The roots are effectively "burned" off, causing the plant to constantly produce new and healthy branching roots. If roots are not exposed to air, they continue to grow around the container in a constricted pattern. The roots may spiral, twist, kink or become stem girdling. When such a plant is later installed into the landscape it will likely fail to establish a normal root structure, and instead will have reduced uptake of water and nutrients. Eventually abnormal growth should be obvious and could cause the plant to fail. Damaged root systems also causes leaves to turn yellow or brown, shrivel or drop. Healthy, highly branched root structures allow a plant to more efficiently uptake water and nutrients while increasing growth and overall plant health. A strong, fibrous radially extending root system will make a plant better able to establish itself when installed in a planting project.

Many plant containers have been developed that attempt to encourage side root growth, via air root pruning, and reduce circling of the roots. For instance, many cylindrical plant containers exist that incorporate small size side apertures in an attempt to inhibit such concentrated spiral and circular root growth. In all these designs, however, the side apertures are relatively small, and are not sufficiently abundant. This is due to the fact that too large and too many apertures will not retain the soil properly, allows the water to pass through the sides too quickly, not allowing the soil to absorb moisture, and accelerates evaporation. Although the mere presence of a side aperture or apertures do function to encourage side root growth, air-pruning of the roots, and initially reduce the incidence of spiraled or circled roots, eventually the small sidewall apertures become filled with roots or the secondary roots the encounter sidewall and deflect, causing spiraling and circling to ensue. The large amounts of obstructive material greatly increases the opportunity for the development of circling and stem girdling roots. Once the apertures have become filled with roots the opportunity for air pruning is diminished and root circling begins. Typical of such designs are disclosed in U.S. Pat. Nos. 4,442,628; 4,497,132; 4,510,712; 4,753,037; 4,939,865; 5,099,607; 5,131,185; 5,241,784; 5,557,886; and 5,937,577.

Accordingly, it is therefore highly desirable to provide a transplantable plant container that encourages regenerative root growth though the container sidewall, even after air pruning has commenced, until the plant is transplanted or planted into the landscape.

It is further desirable to provide an improved plant container for growing transplantable plants, whereby spiral and circular root growth is reduced or substantially prevented, and the development of lateral root tips at the bottom and around the sides of the container is maximized by air root pruning.

It is still further desirable to provide a plant container that is formed to improved plant growth wherein the production of lateral root tips is promoted at all levels in a plant growth medium and the root tips quickly grow in all natural directions radially from the plants main stem, whereby the plant is quickly laterally anchored when transplanted and maximum water and nutrients are absorbed.

Despite the abundance of container designs available that improve the health of a transplantable plant, there remains a need for a container that enhances root development by air pruning of the roots and significantly prevents circling and stems girding roots.

SUMMARY OF THE INVENTION

The present invention provides a bounding apparatus for bounding a growing medium for a transplantable plant in a manner significantly promoting air root pruning therethrough. As a consequence, root regeneration is vastly improved. The bounding apparatus includes a sheet-like lattice framework defining a plurality and high density of spaced apertures. The bounding apparatus further includes a relatively thin, moisture absorbent liner material disposed adjacent the lattice framework. This liner material is sufficiently penetrable to enable root penetration by the plant roots, at the apertures, yet has sufficient structural integrity, when moist, to bound the growing medium and moisture across the spaced apertures of the lattice framework.

In particular, this present inventive bounding apparatus is incorporated into a sidewall support of a transplantable plant container assembly. The container assembly includes an interior cavity for the growing medium that is defined by the sidewall support and a bottom support. The sidewall support and the bottom support each have a respective interior wall and an opposed respective exterior wall. The sidewall support is comprised of a lattice framework defining a plurality of spaced apertures that extend from the interior wall to the exterior wall. Similarly, the container assembly further includes a relatively thin, moisture absorbent liner material which is disposed adjacent to the lattice framework. Similarly, the liner material is sufficiently penetrable to enable root penetration therethrough, by the plant, at the apertures. However, the liner material must also have sufficient structural integrity, when moist, to bound the growing medium and moisture across the spaced apertures of the lattice framework when contained in the interior cavity.

Accordingly, the present invention utilizes an abundant density of relatively large apertures, extending through the sidewall, together with an absorbent liner material, to facilitate and encourage root penetration and growth through the liner. Subsequently, the penetrating root tips are desiccated when exposed to the air (i.e., air root pruning) which causes regenerative growth of secondary roots. Root growth along the natural root path is encouraged, minimizing root circling and girdling, or direction changes that lead the root away from growing through the outer sidewall and bottom for the purpose of air prune the root.

One embodiment of the present invention promotes air-root pruning by including sidewalls and a raised bottom comprised of a plurality of closely-spaced apertures or apertures that are generally greater in dimension (or diameter) than the width of the material that between the adjacent apertures. In particular, the plurality of apertures of the lattice framework collectively define an apertures area that comprises at least about 60% of the total surface area of the framework. More particularly, the apertures area is at least about 80% of the total lattice surface area, and most particularly, at least about 95% of the total lattice framework area.

In another specific embodiment, the thin, moisture absorbent liner material disposed adjacent to the container sidewall (either on the inside or on the outside of the sidewall and bottom) includes, but not limited to paper, cellulose or other fibers with a mixture of polyester or other material, is capable of retaining soil and moisture therein.

The container also includes a bottom support that is oriented a distance sufficiently above the point at which the container contacts on the ground to allow for air pruning and to avoid perched water. Preferably, this elevated distance above the ground is in the range of about one inch to about 6 inches above the ground (i.e., to promote and encourage air root pruning).

As mentioned above, it is preferred that the sidewall is sufficiently flexible and moveable to form a generally cylindrical shape, from a substantially planar, non-assembled condition, to a bowed, assembled condition. It is further preferred that the container be either: (a) provided with a fastener(s) to secure the edges of the container together when it's formed in the generally cylindrical shape; or (b) seamlessly formed in a generally cylindrical shape, such as by injection molding. The fasteners may be integral with the sheet or provided as a separate component coupled to the sheet.

In one embodiment, the sidewall support is formed in a generally cylindrical shape by joining the edges of the sheet together. The bottom attaches to the sidewall when the cylinder is formed. As mention the bottom is raised well above the point at which the container contacts on the ground. For example, this may be achieved by overlapping one of the edges over the other of the edges, and securing the one edge over the other edge along the length of the edges by using rivets, self locking rivets, or other conventional fasteners. In one configuration, the overlapping of the edges is guided by the engagement of a lattice of root-directing protuberances in the region adjacent the one edge with a complementary lattice of root-directing protuberances in the region adjacent the other edge. In a further alternative embodiment, the edges of the sheet are joined together by joints formed in the edges, such as mortise and tenon joints, snaps, and hooks. The fasteners may be integral with the sheet or provided as a separate component coupled to the sheet.

In another aspect of the present invention, the transplantable plant container assembly includes a multi-piece sidewall support that includes a substantially planar first and second sidewall member. Each sidewall member includes a respective interior wall and an opposed respective exterior wall, and each sidewall member comprising a lattice framework defining the plurality of spaced apertures extending from the interior wall to the exterior wall. Further, each sidewall member includes respective first end edges and opposed second end edges disposed adjacent one another in an end-to-end and an end-to-end manner.

A first hinge mechanism and a second hinge mechanism each hingeably couple the corresponding first end edges of the first sidewall member and the second sidewall member to one another, and the corresponding second end edges of the first sidewall member and the second sidewall member to one another when the respective interior walls face one another in a substantially parallel manner, in a substantially planar, non-assembled condition. In accordance with the present invention, the first and second sidewall members are sufficiently flexible to resiliently bow from the substantially planar, non-assembled condition to a bowed, assembled condition.

In another configuration, the circular peripheral edge of the bottom support is configured to engage the respective interior walls, facilitating retainment of the sidewall members in the bowed, assembled condition. The first and second sidewall members, in particular, define a collective receiving groove formed in the respective interior walls thereof. These grooves are formed and dimensioned for sliding receipt of the circular peripheral edge when oriented in the assembled condition.

Another specific embodiment provides a plurality of respective upstanding support rib members, spaced apart along the respective interior walls of the sidewall members. These upstanding support rib members extend longitudinally from a lower portion of the sidewall members to the respective receiving groove. In this manner, a support ledge is provided at an upper end of each upstanding rib member that functions to provide vertical support to the bottom support when received in the receiving groove.

The container top shelf may be rectangular or square shaped. The square rim serves two functions. First it serves as a handle to facilitate transport of the container. Secondly, when placed container to container in a matrix, the square rims abut and block sun light from reaching outer sidewall, thus, keeping the temperature of the soil in the container cooler.

In one embodiment small size containers for propagation and early production may be connected together by seating into a tray. In one design the pots can be removed from the tray that connects them. The bottom is perforated as well as raised above the point at which it touches the ground or table. The collective container bottoms stabilize the tray and or legs attached to the tray.

In yet another aspect of the present invention, a method of promoting air root pruning at a sidewall of a container device is provided for the root system of a transplantable plant. The method includes providing a container device having a sidewall support comprised of a lattice framework that defines a plurality of spaced apertures extending from an interior wall of the sidewall support to an exterior wall thereof. The method further includes disposing a relatively thin, moisture absorbent liner material substantially adjacent to the interior wall and the lattice framework. The liner material is sufficiently penetrable to enable root penetration therethrough at the apertures, yet has sufficient structural integrity, when moist, to bound the growing medium and moisture across the spaced apertures of said lattice framework when contained in said cavity. The method then includes placing a root ball of a transplantable plant and growing medium into an interior cavity of the container device such that the growing medium substantially urges the liner material into supportive contact against interior wall and the lattice framework In one embodiment, the method further includes moistening the liner material in a manner absorbing moisture. This may include simply spraying the exterior sidewall of the container where moisture is absorbed through the container apertures.

BRIEF DESCRIPTION OF THE DRAWINGS

The assembly of the present invention has other objects and features of advantage which will be more readily apparent from the following description of the best mode of carrying out the invention and the appended claims, when taken in conjunction with the accompanying drawings, in which:

FIG. 18 is an enlarged, top perspective view of a bottom portion of the multi-piece sidewall container assembly of FIG. 9.

FIG. 19 is a bottom perspective view of the bottom portion of FIG. 18.

DETAILED DESCRIPTION OF THE INVENTION

Figure 2:
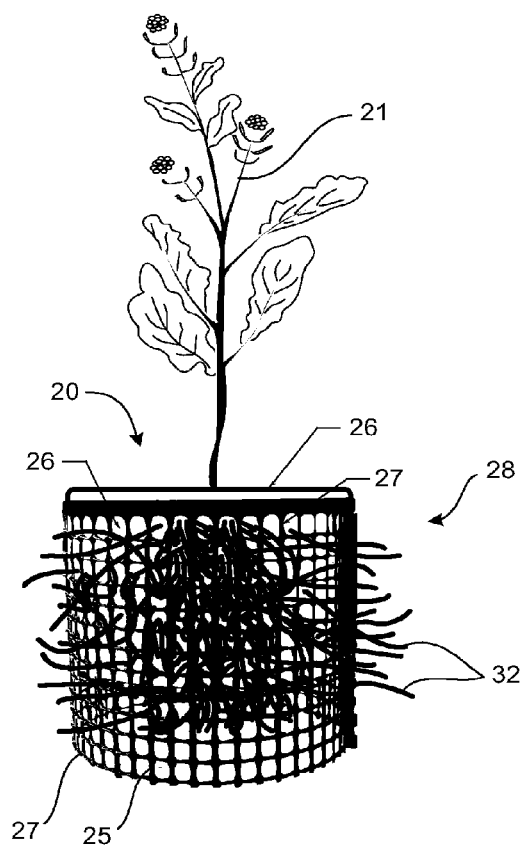
FIG. 2 is a reduced side elevation of the container assembly of FIG. 1 with a plant with its air pruned roots penetrating the absorbent liner material in accordance with the present invention.

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Referring now to FIGS. 1-4, a bounding apparatus, generally designated 20, is illustrated, for bounding a growing medium in which a transplantable plant 21 is grown. The bounding apparatus 20 includes a sheet-like lattice framework 22 defining a plurality of spaced apertures 23 extending through the lattice framework from an interior wall 24 to an exterior wall 25 thereof. The bounding apparatus 20 further includes a relatively thin, moisture absorbent liner material 26 disposed juxtaposed or adjacent (i.e., one in front of the other) to the said lattice framework 22. As will be described in greater detail below, in accordance with the present invention, it is generally the combination of the lattice framework with the high density of apertures and the moisture absorbent liner material 26 that has been found to significantly promote air root pruning, and thus side root regeneration.

Figure 3:
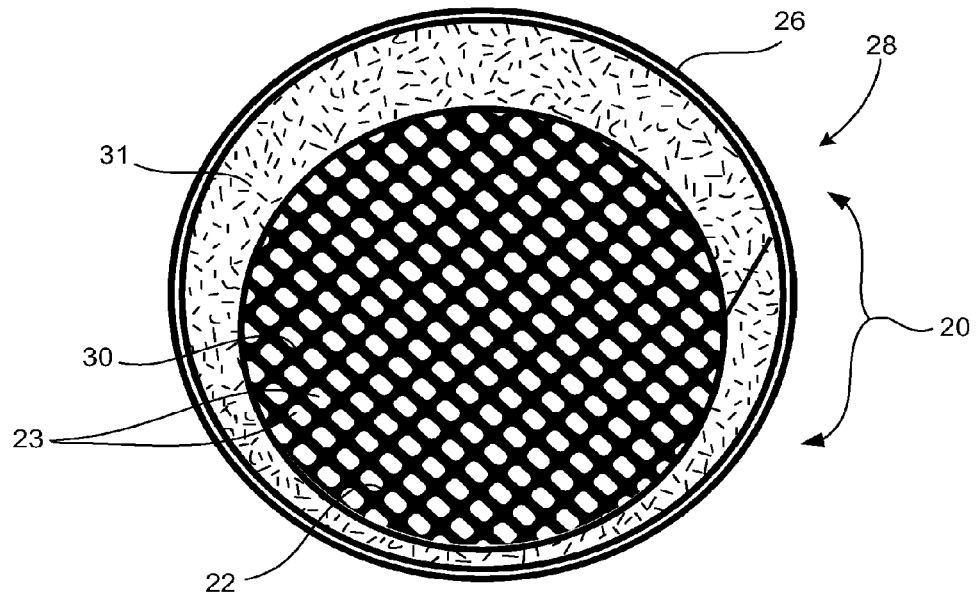
FIG. 3 is a top perspective view of the container assembly of FIG. 1.
Figure 4:
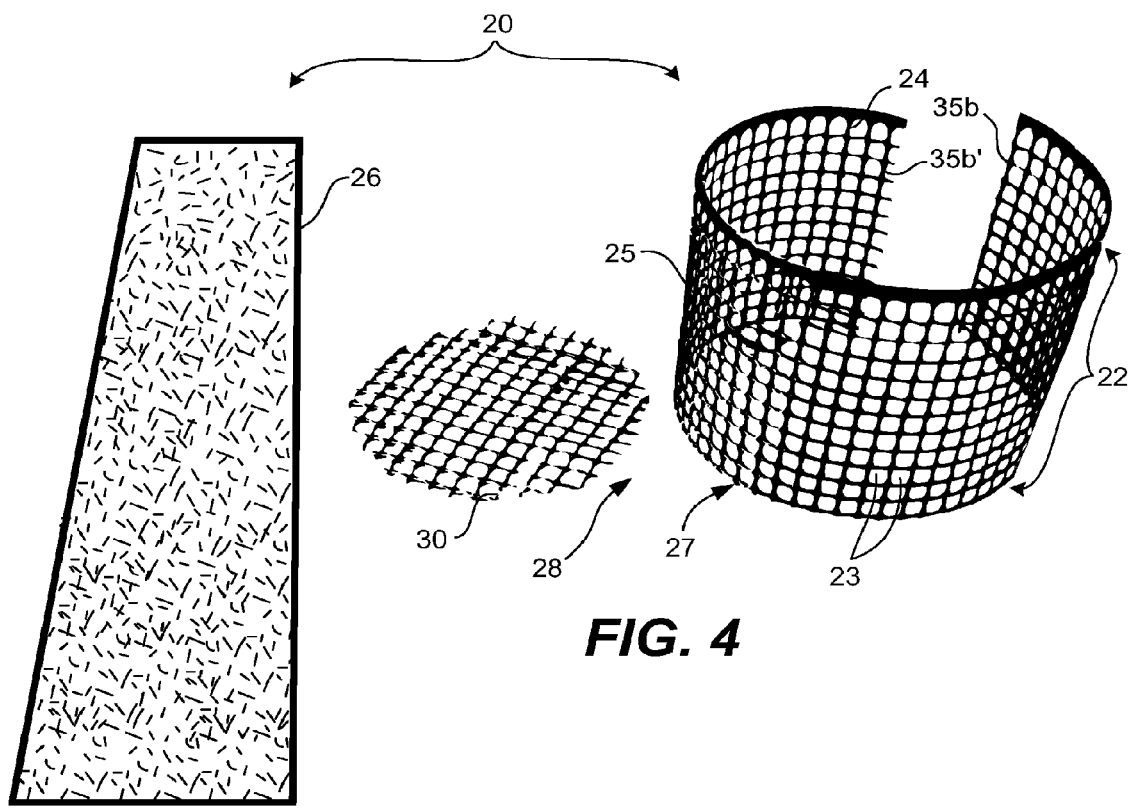
FIG. 4 is a top perspective view of the container assembly of FIG. 1, broken into parts.

More preferably, the bounding apparatus 20 is incorporated into a peripheral sidewall support 27 of a transplantable plant container device 28. The peripheral sidewall support 27, thus, is similarly comprised of a lattice framework 22 that extends all the way around to form the sidewall of the container device. FIGS. 3 and 4 best illustrated that an interior wall 24 of sidewall support 27, together with an interior wall 24 of a bottom support 30, collectively define an interior cavity 31 of the container device which supports the growing medium therein.

Figure 1:
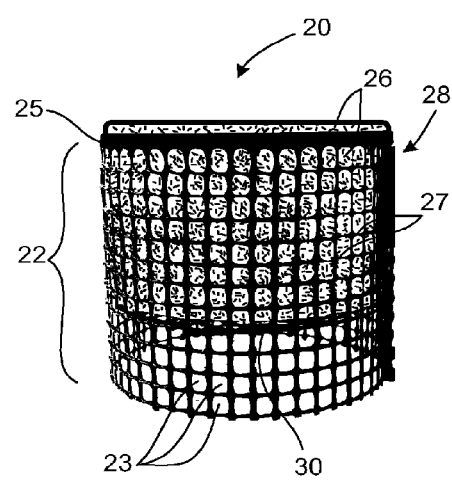
FIG. 1 is a side perspective view of a bounding apparatus and container assembly constructed in accordance with the present invention.

As shown in FIGS. 1 and 3, the absorbent liner material 26 is preferably positioned adjacent and juxtaposed to the interior wall 24. Therefore, when growing medium (preferably moist soil, although the medium could include, but is not limited to soil, bark, sand and peat) is contained against the absorbent liner material 26, in the container interior cavity 31, the liner material 26 is peripherally supported by the lattice framework 22. The absorbent liner material 26, thus, will not have to provide full lateral support for the heavy, moist growing medium (especially detrimental with larger containers), and can rely upon the lattice framework 22 to provide lateral structural integrity. It will be appreciated, however, that for air pruning purposes, the absorbent liner could be disposed adjacent and juxtaposed to the outer exterior wall 25 of the lattice framework as well.

In accordance with the present invention, as mentioned, the moisture absorbent liner material 26 itself functions to retain the growing medium within the container device 28 together with the porous lattice framework 22, especially given the relatively large, as well as high density of apertures 23, in the container sidewall. Thus, the liner material 26 must be composed of a material having sufficient structural integrity, when moist, to bind the moist growing medium within the interior cavity 31, across the spaced apertures 23 in the lattice framework 22. This liner quality, however, is much easier to accommodate across the liner due to the additional lateral support provided framework around each aperture 23

The absorbent liner material 26, moreover, must also be sufficiently absorbent to retain moisture about the container periphery. This encourages regenerative root growth outwardly from the plant 21 toward and out of the container sidewalls, via the relatively large diameter apertures (i.e., air root pruning, as will be described). The absorbent liner material 26, therefore, must further be sufficiently penetrable, by the root, to enable root penetration through the liner, at the apertures of the lattice framework 22 (FIG. 2).

Once these roots penetrate the liner material, at the container apertures 23, their root tips are exposed to relatively dry air, and are subsequently desiccated or killed. As these exposed root tips are air pruned, they lose their dominance, allowing many secondary roots develop to replace the desiccated tips. This regenerative cycle of air pruning occurs over and over, as even more roots are replaced if permissible, through the relatively larger diameter apertures 23 of the sidewall support 27.

Accordingly, as indicated, the moisture absorbent liner material 26 not only retains the soil in the interior cavity 31 of the container device when the root growth is not mature, but also retains moisture at the periphery of the sidewall. This moisture encourages root growth through the abundant apertures 23 of the lateral support providing sidewall support 27, where the root tips penetrate the absorbent liner material. Once the root tips of these roots are exposed to air, they become air pruned, causing the cycle to commence all over again. The present inventive container device, thus, facilitates training of the root system with a very large quantity of young vigorous roots that extend outwardly and downwardly through growth media. This allows for continual growth and penetration of new root tips to and through the air-root pruning apertures and liner material, while significantly preventing stem girding and circling roots. Further, the present invention affords the opportunity for root tips to continue developing, and to air root prune due to the large size (relative to the roots) of the sidewall apertures 23. Combined with the moisture absorbent liner material 26, the regeneration and continuous penetration of new roots are encouraged through sidewall apertures.

Examples of such suitable absorbent liner materials include, but are not limited to various papers, cellulose or other fiber materials with a mixture of polyester or other reinforcing materials. Such liner materials, as mentioned, must have sufficient structural integrity to provide reinforcement across the apertures 23 of the sidewalls, while dampen, to retain the soil median and moisture within the container device. The liner, on the other end, must be sufficiently forgiving or penetrable, to enable the roots 32 to penetrate the liner and extend through the apertures of the container device, in a manner encouraging air root pruning. Another required quality of the liner material 26 is that must be sufficiently absorbent to retain moisture therein. This property, as mentioned, encourages root growth toward, as well as root penetration though, the liner for air pruning. Depending upon the composition of the material, the liner thickness can range from about as thin as a conventional letter sized paper (paper) to about ¼ inch thick (cellulose). Thinner liners enable an increased volume of growing medium in the interior cavity, but must provided the requisite sufficient moisture absorbent quality, as well as provide sufficient structural integrity across each framework aperture 23. The liner material 26 is also preferably biodegradable so that it may remain on the root ball when shifted when transplanted into at larger container size or landscape. One particularly acceptable liner material 26, for example, is Ellegaard Paper provided by Ellegaard of Denmark (www.ellepot.dk).

Figure 5:
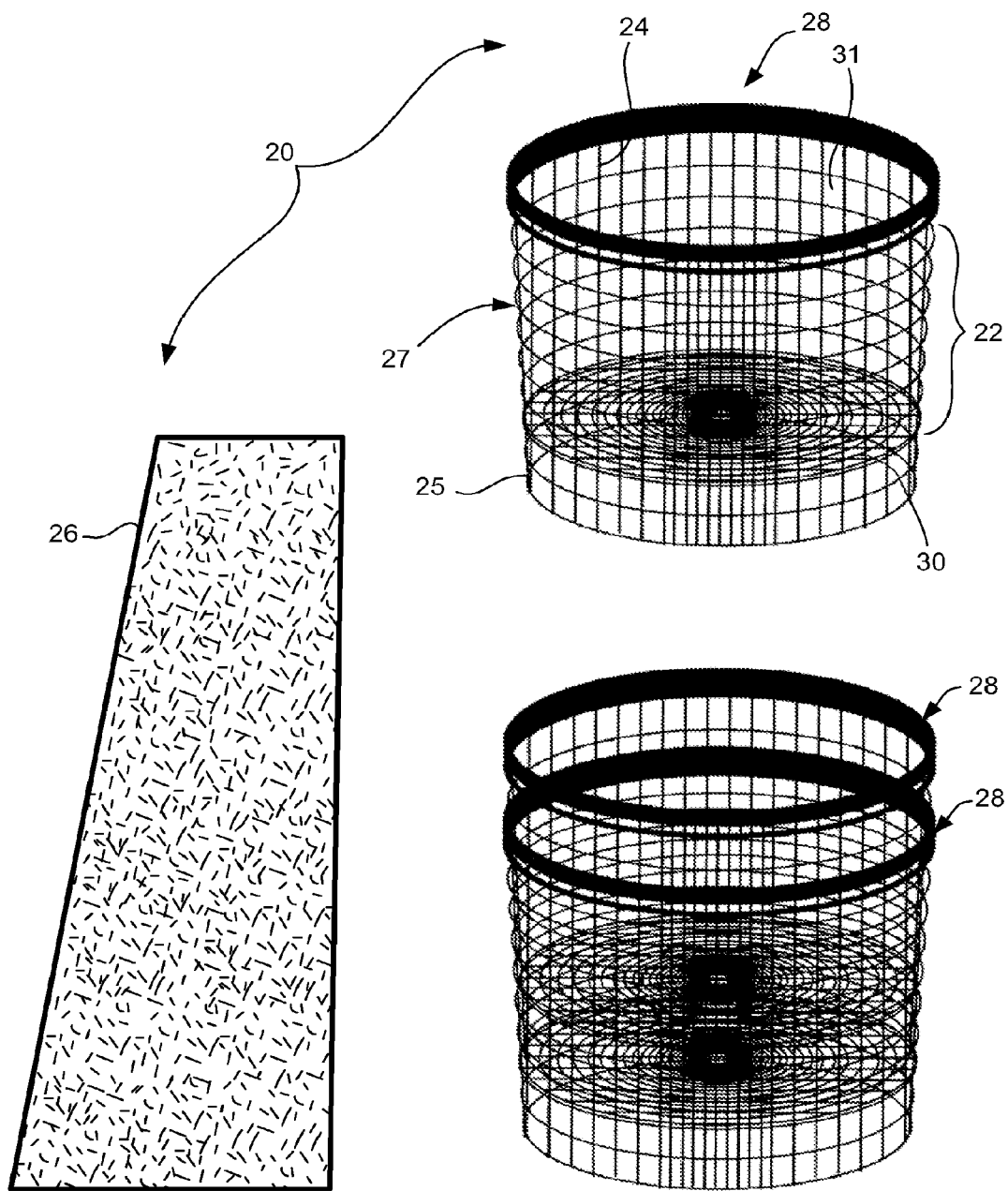
FIG. 5 is a top perspective view of a wire mesh alternative embodiment to the container assembly of FIG. 1, showing stacked nesting of thereof.

Referring now to FIGS. 4 and 5, the container device 28 is shown having the sidewall support 27 with a plurality of relatively large side apertures 23 of a relatively high density. In fact, both the sidewall support 27 and the bottom support 30 (as will be described), define apertures 23 over substantially their entire surface areas thereof.

It is also desirable to select an aperture diameter and/or aperture density that is a sufficiently large so as not to permit the roots to fill and/or clog of the apertures 23. Such clogging of the sidewall apertures, as well as insufficient moisture around the sidewall periphery, will not encourage regenerative root growth through the absorbent liner and apertures. The size of the apertures 23, in one specific embodiment, should be selected to be at least larger than the anticipated diameter of the roots that circle the container sidewall at the anticipated time of transplant.

The greater the aperture density, the smaller the overall aperture diameter can be. In contrast, the lesser the aperture density, the larger the aperture diameter should be. The porosity, however, should be substantially uniformly distributed over the sidewall support surface area, as bunching of the actual wall area may cause root girdling and not provide an avenue for the root tips to penetrate the liner material. As a very general rule, the average width or diameter of the apertures 23 (since apertures of varying width may be employed) is greater than the average distance of the sidewall material between adjacent apertures (i.e., the average aperture spacings).

In one specific embodiment, given the total surface area of the interior wall 24 of the sidewall support (which incidentally should be similar to the outer exterior wall 25), the total collective area of the through apertures 23 is in the range of at least about 60% of the total interior wall surface area. More preferably, this percentage is in the range of at least about 80%, and most preferably, the total aperture surface area is in the range of at least about 95% of the total interior wall surface area.

As shown in FIGS. 1 and 5, in one configuration, the sidewall support 11 is comprised of a course mesh-type lattice framework 22 having relatively square, rectangular or rhombus shaped apertures that maximize the aperture size, as well as density. In this particular embodiment, by way of example, the mesh material has a width in the range of about ⅛ inch to about ¼ inch thick, while the apertures 23 have a width in the range of about ¼ inch to about 1.0 inch. It will be appreciated, of course, that other dimension material widths and apertures are acceptable. Moreover, it will be appreciated that while a lattice-type structure typically refers to rhombus or diamond shaped holes, in the meaning of the present invention, the apertures can be any reoccurring shape, and particularly that mentioned above, as well as a circle or oval, or any combination of shapes listed above.

In another specific embodiment, the material of the sidewall support 27 of the container device 10 may be composed of a flexible plastic material, a metallic wire material, and/or a biodegradable material, or the like that is adapted to be easily manually configured generally in a cylindrical-shell of frustoconical-shell shape. Alternatively the container device 28 could be formed of aluminum or another suitable metal, or of other materials such as a papier-mâché with some fiberglass or other fibers added to provide strength and durability The container devices 28 may be manufactured in various ways. For example, the container device may be hot-pressed or injection-molded into one complete piece. Alternatively, as will be described below, the container device may be manufactured in multiple pieces that enable substantially flat, unassembled, storage of the container for easy shipping and assembly thereof.

Although the general shape of the sidewall support 27 of the container device 28 is illustrated as substantially cylindrical shaped, as indicated, the sidewalls may taper inwardly from the top portion toward the bottom support thereof, format a frustum. As shown in FIG. 5, such taper enables nesting and stacking of the container devices for shipping and storage.

Referring now to FIGS. 3 and 4, the container bottom support 30 is preferably circular, and itself may incorporate a sheet-like lattice framework 22 having a plurality of apertures, similar to that of the sidewall support 27. Moreover, the container bottom support 30 is configured to raise the bottom support 30 a sufficient distance above the ground so as to permit room underneath the container device for the roots to air root prune, and to further avoid perched water (FIGS. 1 and 5. For example, the bottom support 30 of the container device 28 may be displaced in the range of about one inch to about six inches above the ground (i.e., the point at which the container device contacts on the ground.

Figure 6:
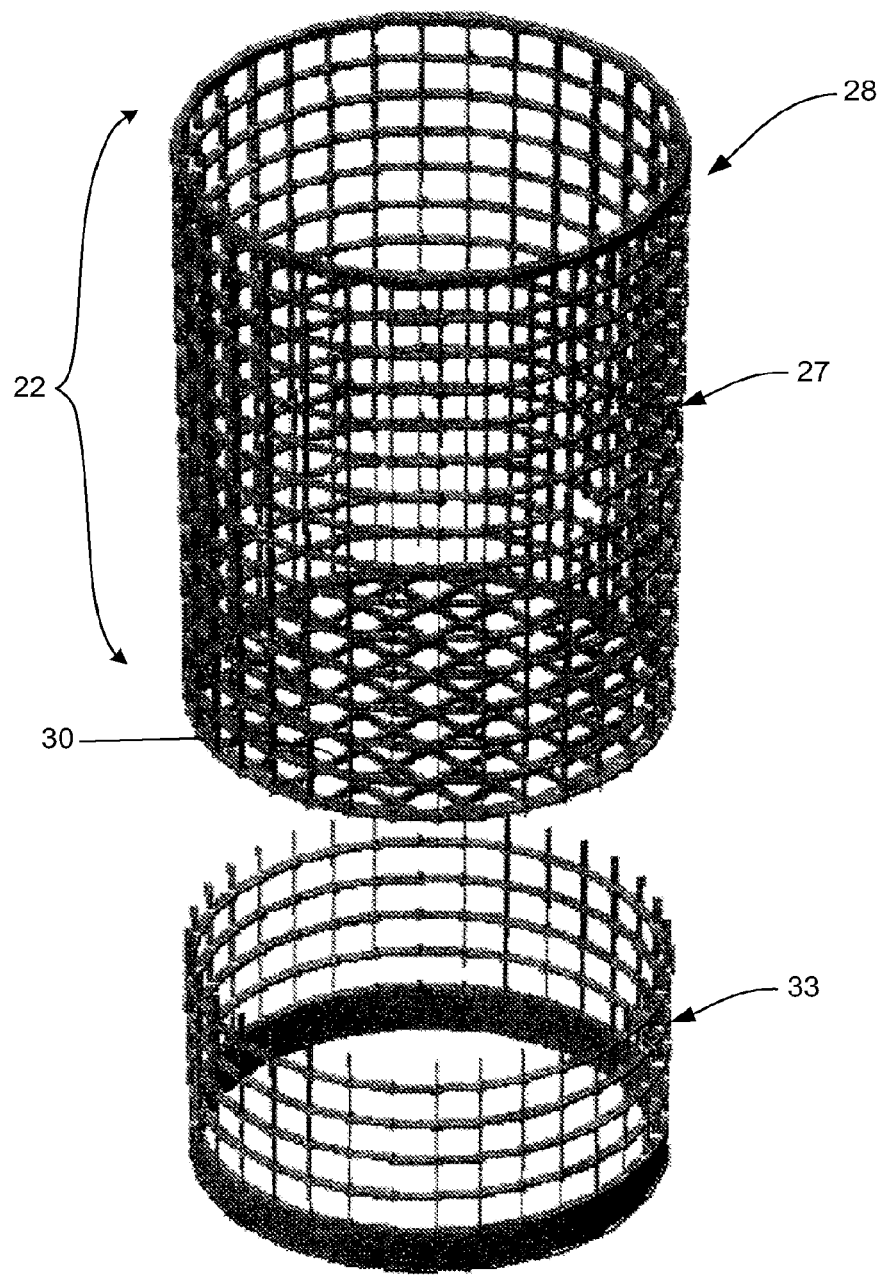
FIG. 6 is an enlarged top perspective view of the container assembly of FIG. 1, having a detachable pedestal.

Since the bottom support 30 is detachable mounted to the sidewall support 27, in the embodiments of FIGS. 1-4, the bottom surface can be vertically elevated anywhere thereal-ong. In another specific embodiment, as shown in FIG. 6 the container device may include a detachable pedestal 33 that mounts to the bottom of the container device 28, and thus, elevates the bottom support above the ground.

Moreover, the lattice framework 22 of the bottom support 30 may also include a respective circular absorbent liner material (not shown) disposed adjacent, and juxtaposed, to the framework. This liner material exhibits the same qualities and properties as that of the sidewall liner material. This combination (i.e., high density of apertures 23 of the bottom lattice framework 22 and the absorbent liner material) similarly promotes significant air root pruning, and thus bottom root regeneration.

In another aspect of the present invention, referring now to FIGS. 7 and 8, the container device 28 is assembled from a substantially planar sidewall support 27 (although the embodiment depicted actually incorporates a multi-piece design, as will be described below) and an independent bottom support 30. This configuration simplifies bulk transportation of the components due to the substantially flat nature of the sidewall support and the bottom support. Assembly of the components, however, is required.

In this configuration, both the sidewall support 27 and the bottom support 30 of the container device 28 are more structurally robust than that of the wire mesh embodiments shown in FIGS. 1-5. However, the sidewall support 27 must also be sufficiently flexible to resiliently bow from a natural, substantially planar, non-assembled condition (FIGS. 7 and 8) to a bowed, assembled condition (FIGS. 9 and 10), forming a cylindrical shell or frustoconical shell-shaped side wall.

Briefly, the opposed end edges 35b, 35b' of the sidewall support 27 are configured to mate and join together, in the assembled condition, forming the substantially cylindrical or frustoconical shell shape. Such coupling may be provided by various coupling techniques widely applied. In some techniques, the coupling may be more permanent, or semi-permanent, such as through fasteners, an adhesive, ultrasonic welding or the like. Preferably, however, the end edges 35b, 35b' are configured to removably couple together, such as a snap-fit connection, which would permit disassembly if desired. Another particular technique that incorporates a hinged coupling will be further detailed below.

Figure 9:
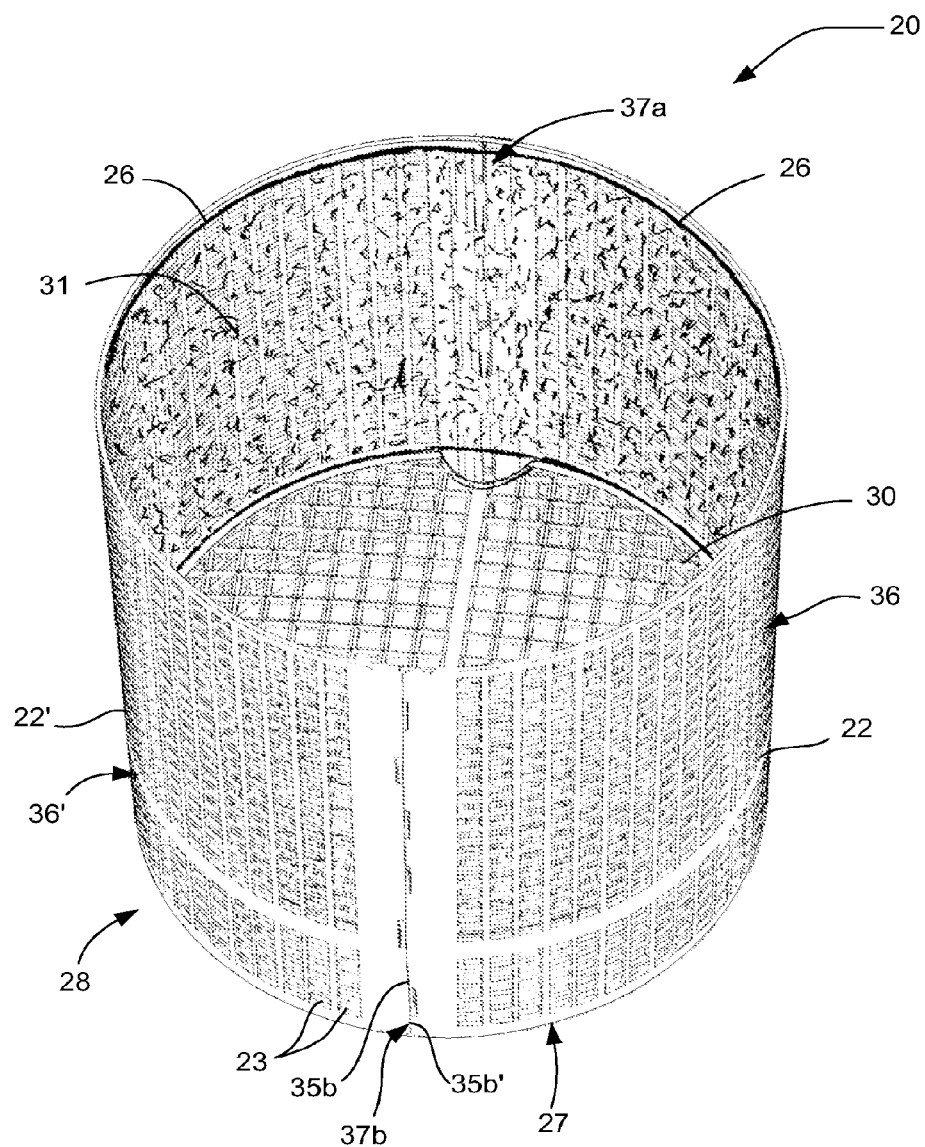
FIG. 9 is a top perspective view of the container assembly of FIG. 7, in an assembled condition, and showing positioning of the absorbent liner material.
Figure 10:
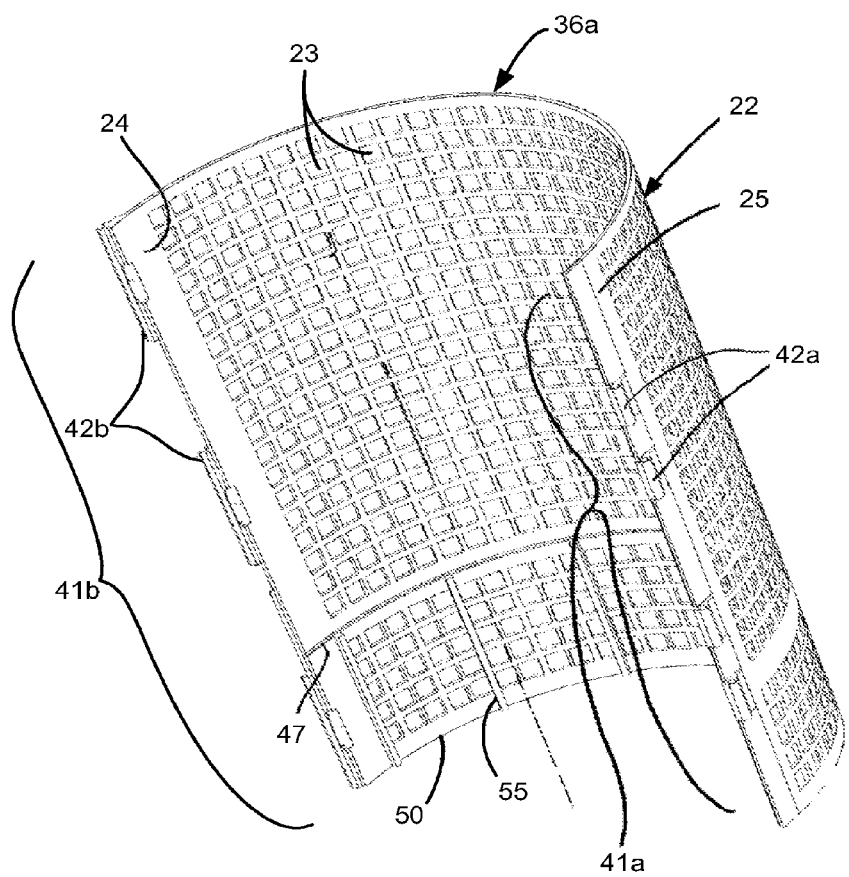
FIG. 10 is a top perspective view of one sidewall member of the container assembly of FIG. 7, with the sidewall member in a bowed, assembled condition.
Figure 11:
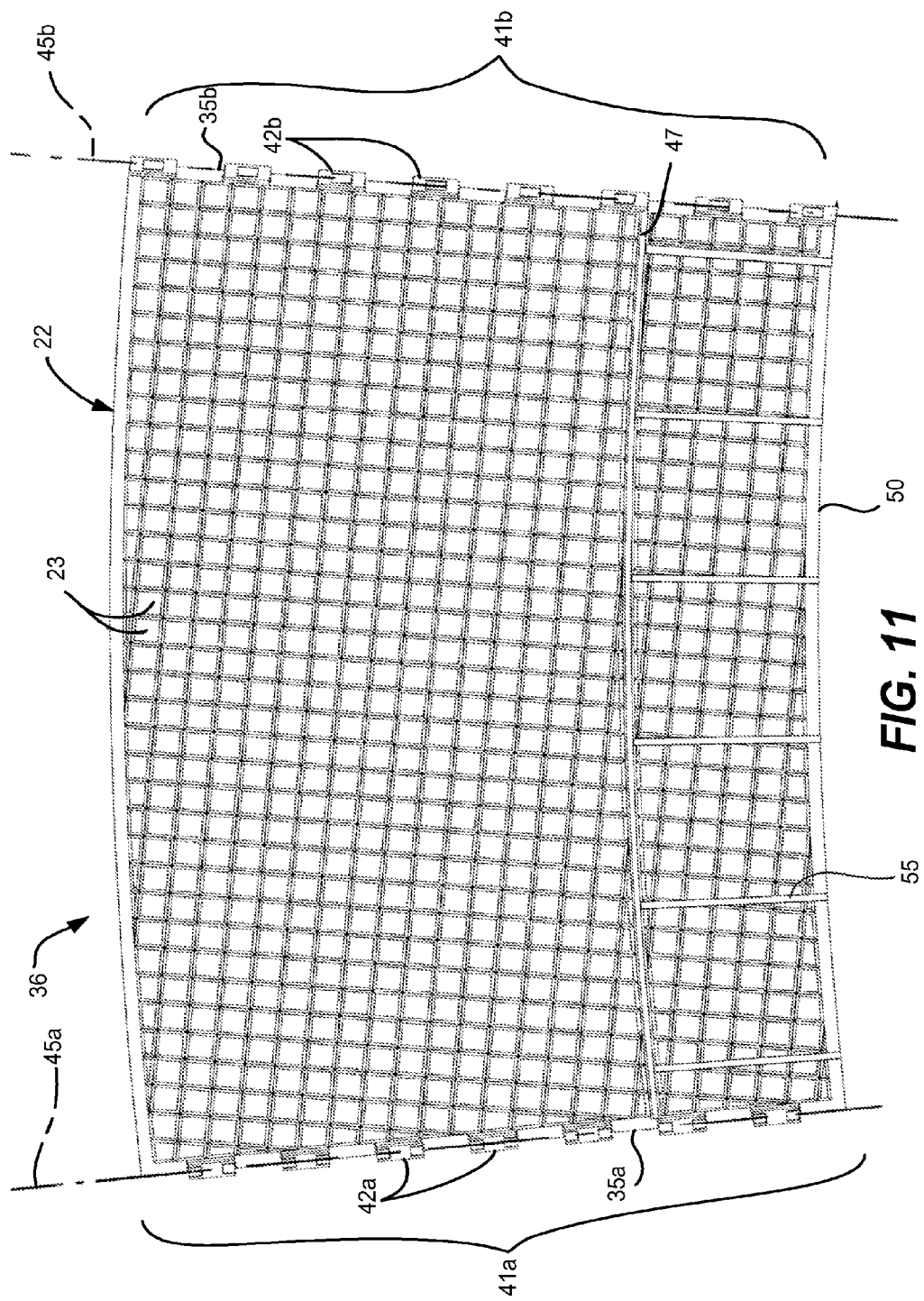
FIG. 11 is a side elevation view of the one sidewall member of FIG. 10, in a substantially planar, non-assembled condition.

Referring now to the embodiments of FIGS. 7-20, the sidewall support 27 incorporates a multi-piece sidewall design having at least a first and a second sidewall member 36, 36' that cooperatively couple together in an end-to-end (i.e., 35a, 35a') and an end-to-end (i.e., 35b, 35b') manner to form the assembled sidewall support. Preferably, each sidewall member 36, 36' is similarly sized and dimensioned to one another. As mentioned, each sidewall member 36, 36' incorporates the sheet-like lattice framework 22, 22', and is sufficiently flexible to resiliently bow from the natural, substantially planar, non-assembled condition (FIGS. 7, 8 and 11-14) to a bowed, assembled condition (FIGS. 9, 10 and 15). In the bowed, assembled condition, each end edge 35a, 35b and 35a', 35b' of each respective sidewall member 36, 36' is bowed about 90° from the substantially planar, non-assembled condition, to substantially form a semi-cylindrical or semi-frustoconical shape (FIG. 9). Collectively, the two bowed sidewall members 36, 36' cooperate, when mounted in an end-to-end and an end-to-end manner, in the assembled condition, form the cylindrical/frustoconical shell-shaped container device 28.

Briefly, it will be appreciated that to form the cylindrical shell-shaped sidewall support 27, each of the first and second sidewall member 36, 36' is substantially rectangular-shaped, in the substantially planar, non-assembled condition. In contrast, for the tapered, frustoconical shell-shaped sidewall support 27, each sidewall member 36, 36' is initially substantially trapezoid shaped, in the substantially planar, non-assembled condition. Regardless of the particular shape selected, each sidewall member 36, 36' defines respective opposed end edges 35a, 35b and 35a', 35b' that mount end edge to end edge (35a, 35a') and end edge to end edge (35b, 35b') with the opposed sidewall member.

As mentioned above, the respective end edges 35a, 35a' and 35b, 35b' of the opposed first and second sidewall members 36, 36' are preferably removably coupled together via a first hinged mechanism 37a, and a second hinged mechanism 37b. These opposed hinge mechanism 37a, 37b each permit pivotal movement of the respective end edges 35a, 35a' and 35b, 35b' about respective hinge axes 38a, 38b of rotation extending in directions substantially parallel to the joined end edges.

Figure 12:
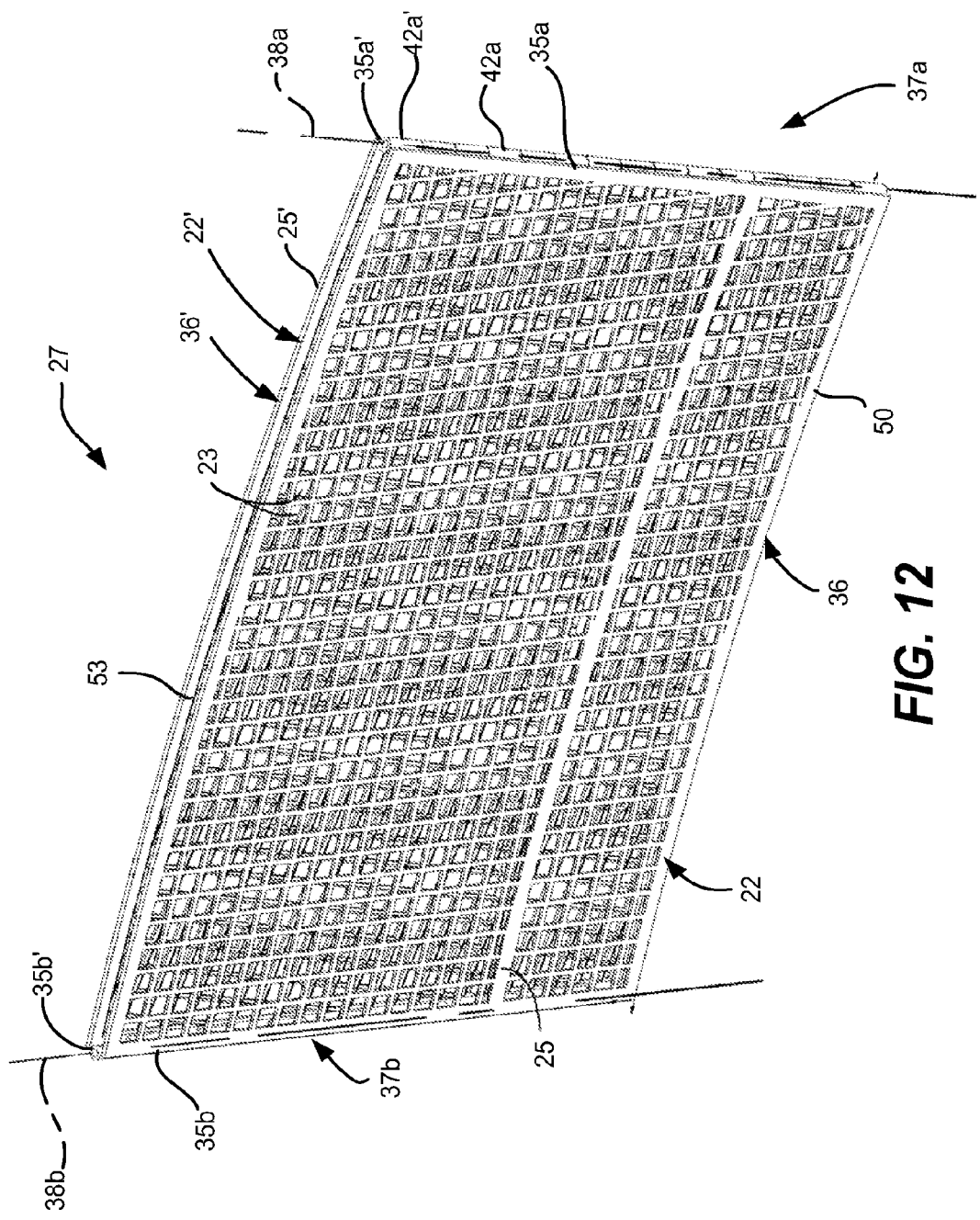
FIG. 12 is a side perspective view of a pair of connected sidewall members, both in the substantially planar, non-assembled condition, of the multi-piece sidewall container assembly of FIG. 7.
Figure 13:
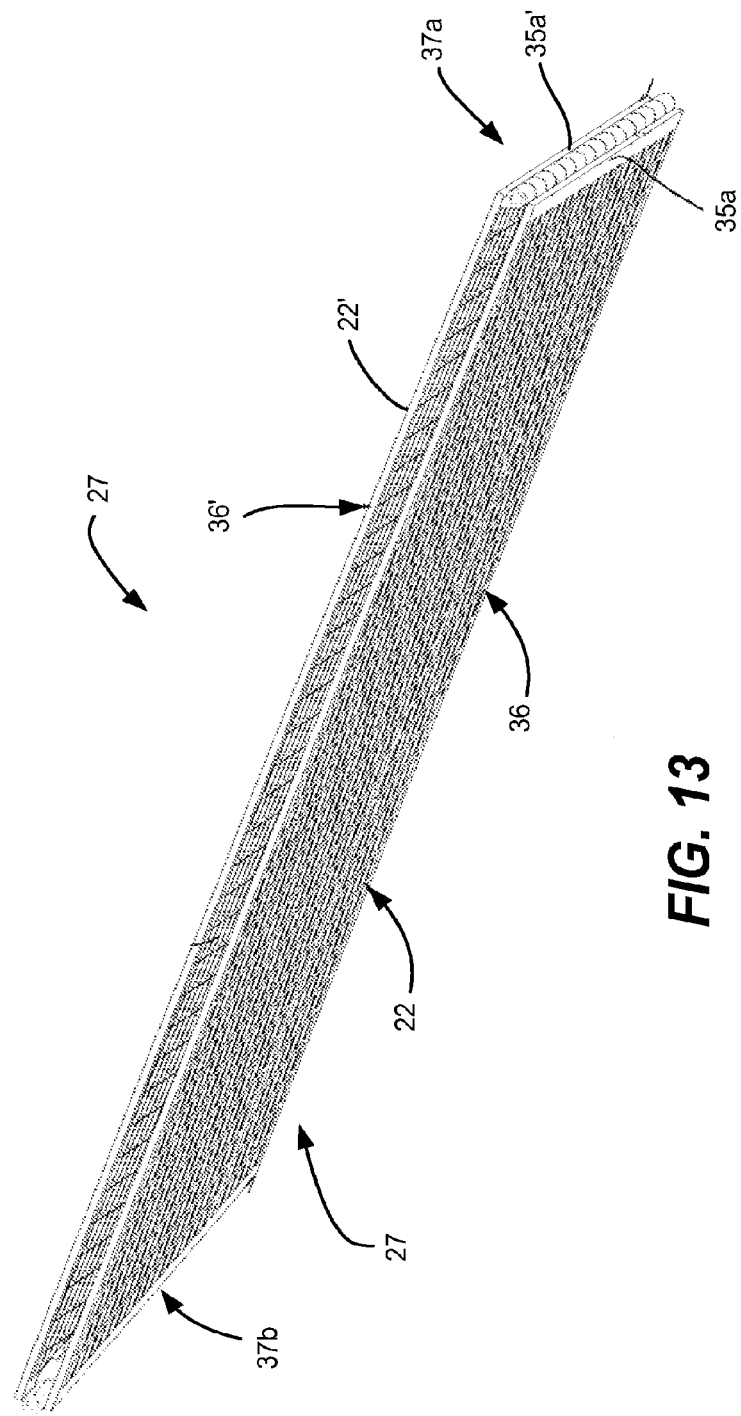
FIG. 13 is a top perspective view of the sidewall members of the multi-piece sidewall container assembly of FIG. 12.

In one particular embodiment, as shown in FIGS. 12 and 13, these assembled hinge mechanisms 37a, 37b allow transportation of the container device 28 while the sidewall members 36, 36' are in a substantially planar, non-assembled condition. Accordingly, as will be described in greater detail below, such couplings allow the simplified assembly of the container device, especially in the frustoconical shaped container device 28. By simply inserting the bottom support 30 into the interior cavity, the circumferential edge 40 of the bottom support 30 can be applied to contact the respective interior surfaces of the sidewall members, and urge the hinge mechanisms from a closed position (FIGS. 12 and 13), when the sidewall members 36, 36' are in the substantially planar, non-assembled condition, to an opened position (FIGS. 7 and 8), simultaneously bowing the flexible sidewall members toward the assembled condition (FIG. 9).

As best viewed in FIG. 9, the first and second hinge mechanisms 37a, 37b are preferably configured such that the hinge axes 38a, 38b of rotation are oriented within the interior cavity side of the container device 28, while in the assembled condition. In this manner, both substantially closed hinge mechanisms 37a, 37b can be mounted to and assembled with substantially planar sidewall members 36, 36', in the non-assembled condition, to facilitate transportation (FIGS. 12 and 13). This interior orientation of the hinge axes 38a, 38b is beneficial in that the hinge mechanisms 37a, 37b can be simultaneously operated from the closed condition to the opened condition (i.e., from about 0° to about 180°) without interfering contact with the first and second sidewall members 36, 36', as they flex from the substantially planar, non-assembled condition to the bowed, assembled condition.

Figure 16:
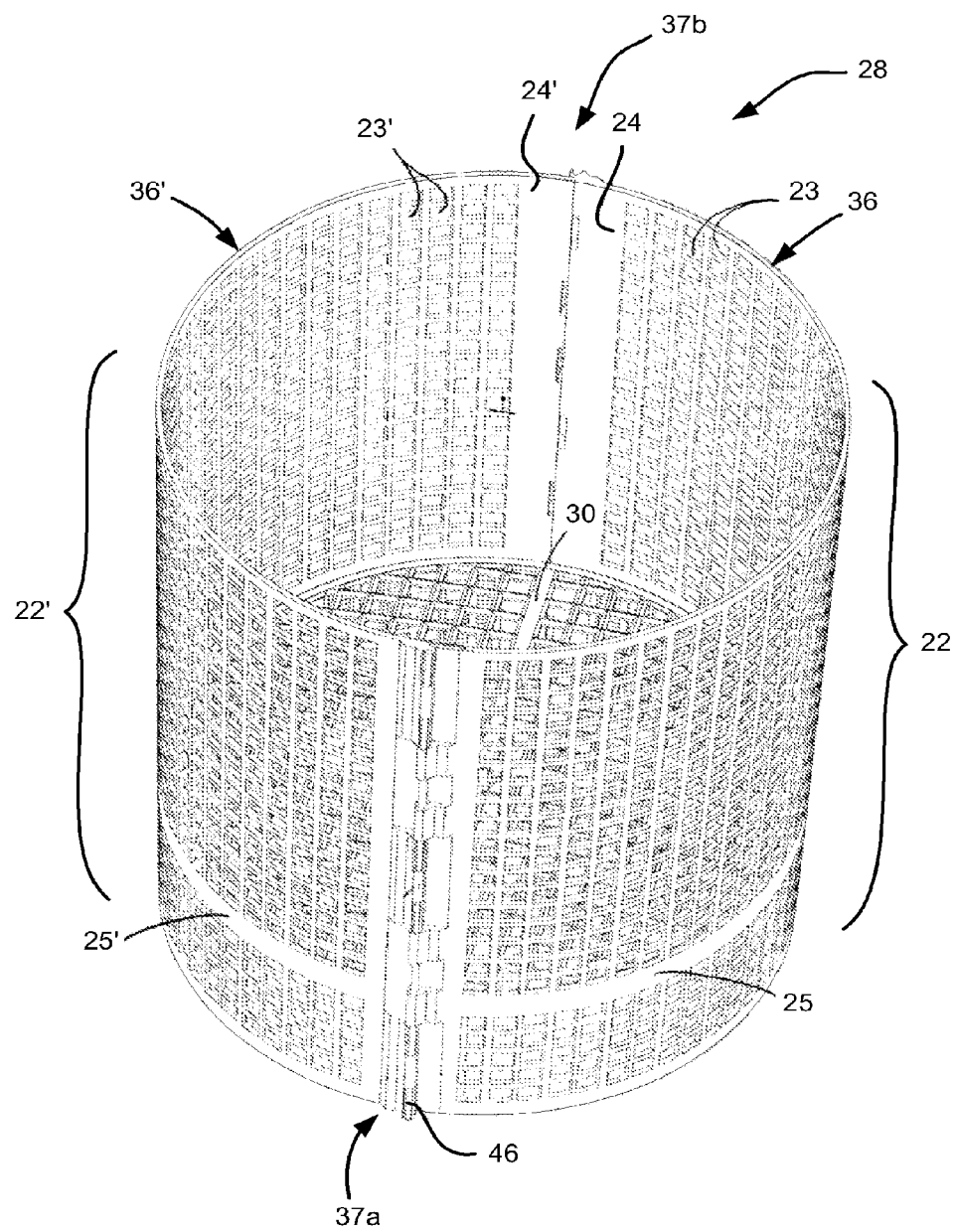
FIG. 16 is a top perspective view of an alternative embodiment to the multi-piece sidewall container assembly of FIG. 9, with a hinge mechanism oriented outside of the container assembly.

It will be appreciated, however, that the hinge mechanisms 37a, 37b can be configured such that the hinge axes 38a, 38b of rotation are oriented on the exterior side of the container device 28 (FIG. 16). In this embodiment, the hinge mechanisms cannot simultaneously hingeably couple the substantially planar sidewall members 36, 36' together, in the non-assembled condition, and further do not enable the sidewall members to bow toward the assembled condition without disassembly of at least one of the hinge mechanisms.

The first and second hinge mechanisms 37a, 37b will be described. Since both the first and second hinge mechanisms 37a, 37b are substantially similar, however, only the first hinge mechanism 37a will be detailed. As shown in FIG. 18, integrated along each opposed end edge 35a, 35a' is a first set 41a of bracket member 42a, on the first sidewall member 36, and a corresponding second set 41a' of bracket member 42a', on the opposed second sidewall member 36', of the first hinge mechanism 37a. These opposed bracket members 42a, 42b are alternatively spaced apart, and correspondingly aligned with one another along the respective opposed end edges 35a, 35a'. That is, the first set 41a of bracket member 42a is disposed along the respective opposed end edges 35a of the first sidewall member 36, and the second set 41a' of bracket member 42a' is disposed along the respective opposed end edges 35a' of the second sidewall member 36', albeit off-set with one another To position the collective first hinge axis 38a at the interior cavity 31 of the container device 28, each of the first set 41a and the second set 41a' of bracket members 42a, 42a' extends outwardly from the respective interior wall 24, 24' along the corresponding end edges 35a, 35a'. Each bracket member 42a, 42a' further defines a respective longitudinal first and second passage 43a, 43a', extending longitudinally therethrough that are coaxially aligned along a common first and second longitudinal axis 45a, 45a', with respect to their respective bracket set 41a, 41a'.

Figure 17:
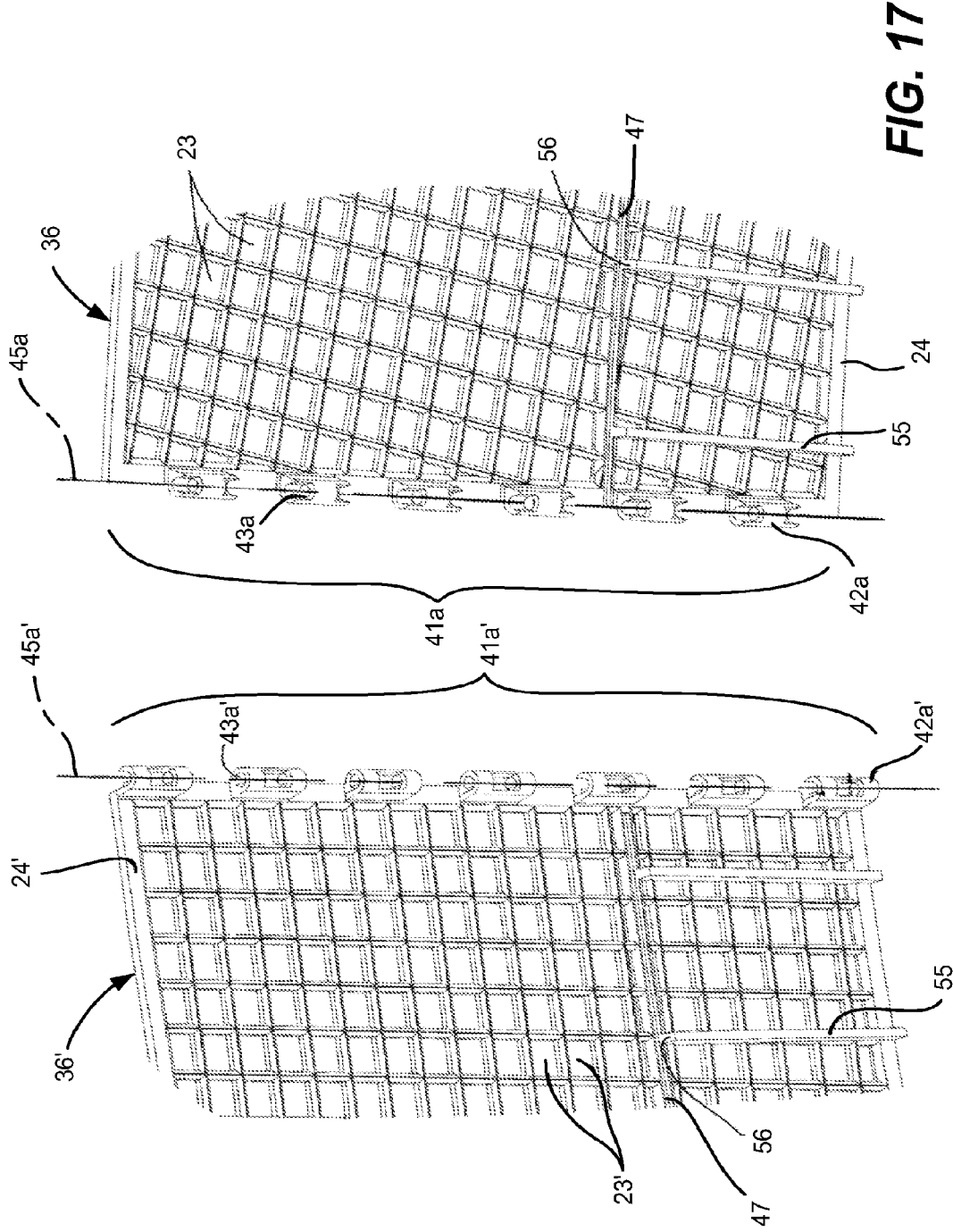
FIG. 17 is an enlarged, fragmentary, top perspective view of a hinge mechanism of coupling the opposed sidewall members of the multi-piece sidewall container assembly of FIG. 7.

These opposed bracket members 42a, 42a' of the first and second set 41a, 41a' are spaced apart from one another, within each set, and are correspondingly off-set from one another, as a set, with respect to the opposing set. As best illustrated in FIGS. 8 and 17, the first and second set of bracket members can thus be engaged and intercoupled with one another, in a manner substantially coaxially aligning both the first longitudinal axis 45a and the second longitudinal axis 45a' along a common first hinge axis 38a.

Figure 7:
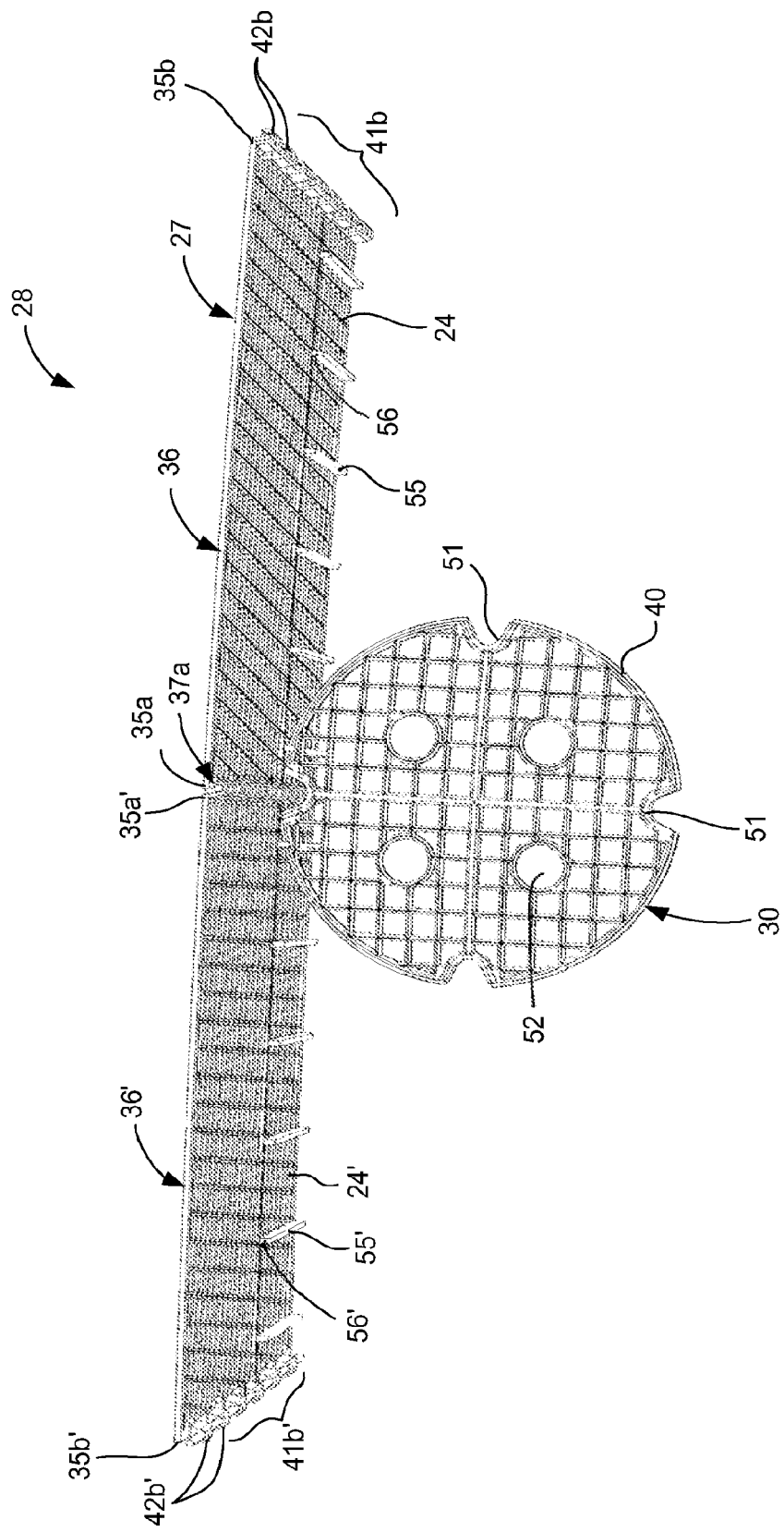
FIG. 7 is a top perspective view of a multi-piece sidewall alternative embodiment to the container assembly of FIG. 1, in a non-assembled condition.
Figure 8:
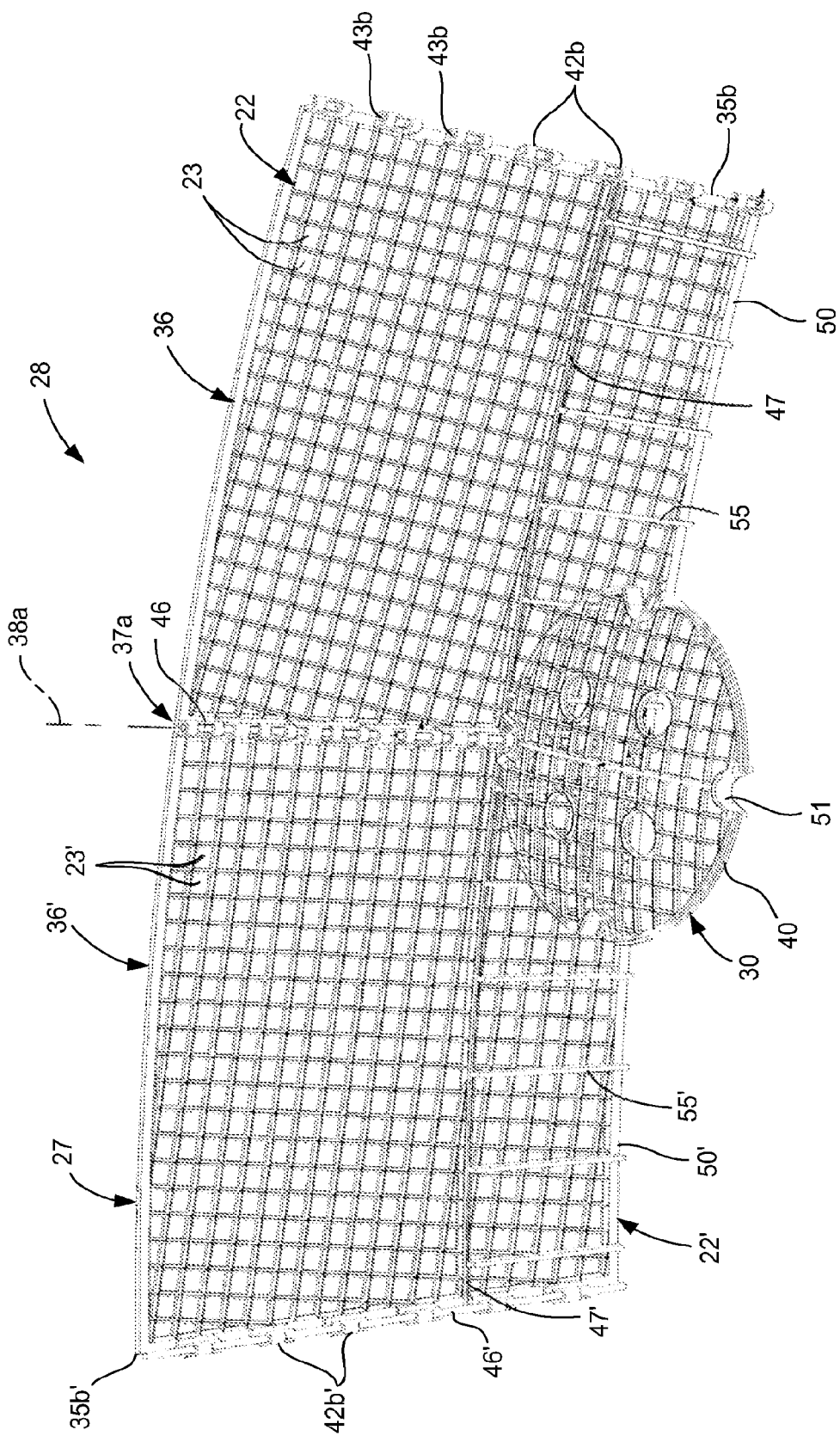
FIG. 8 is side perspective view of the container assembly of FIG. 7.
Figure 14:
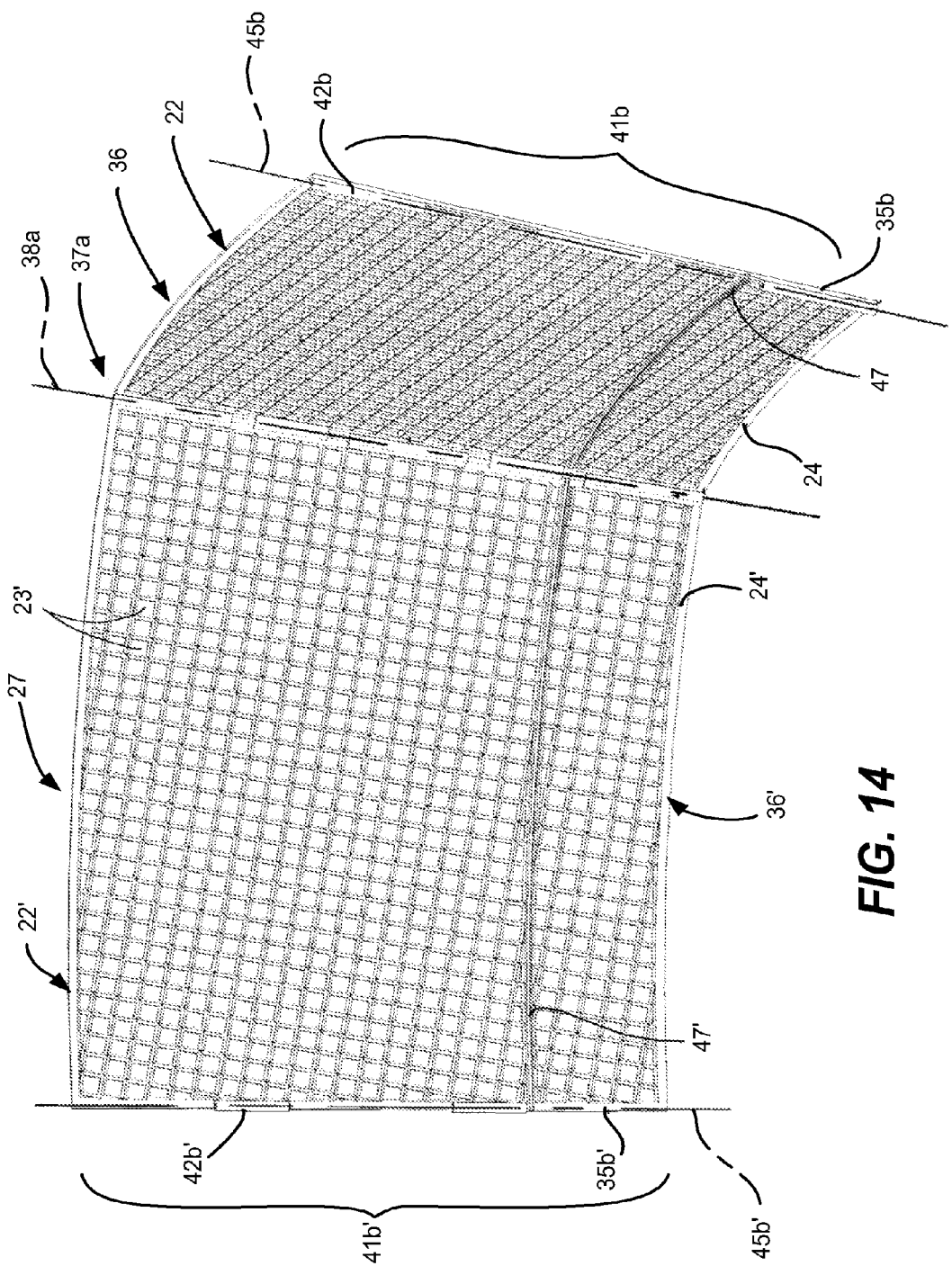
FIG. 14 is a side perspective view of the sidewall members of FIG. 12, with the sidewall members hinged at 90° relative to one another.
Figure 15:
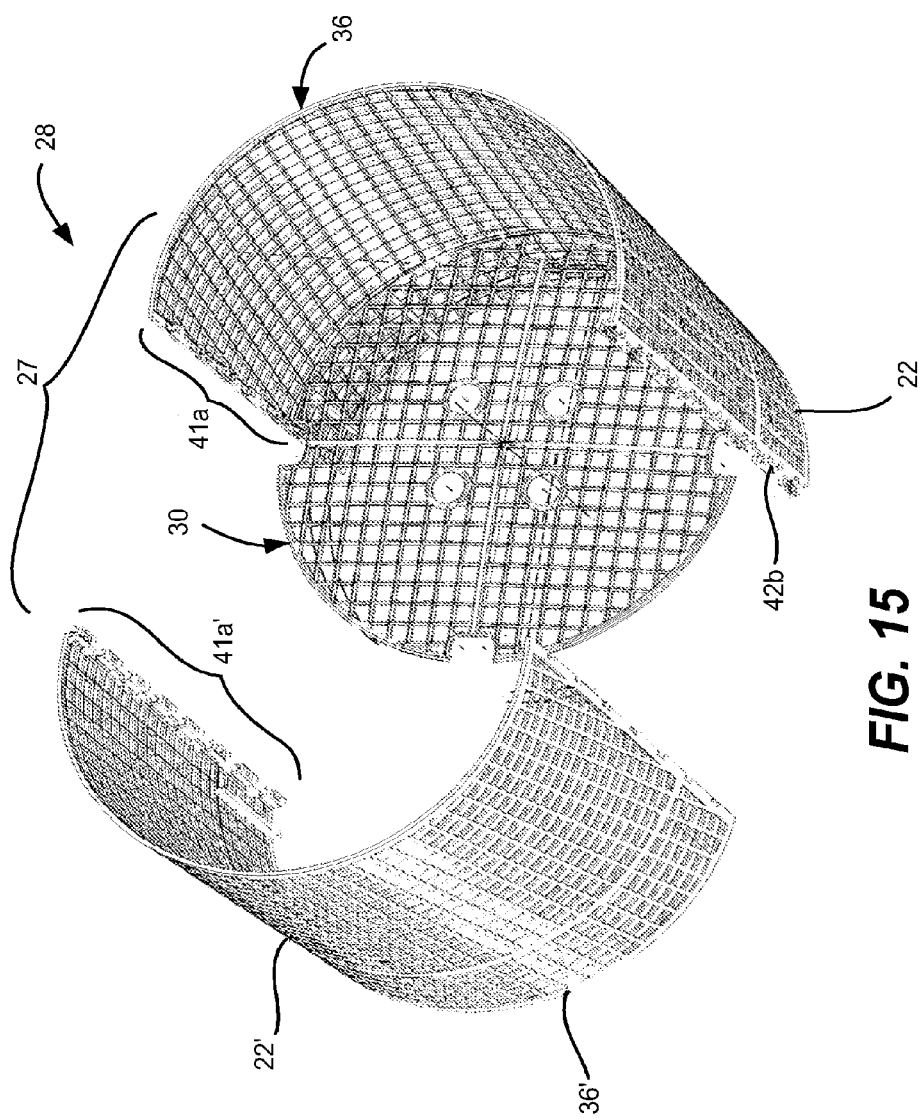
FIG. 15 is an exploded, top perspective view of the multi-piece sidewall container assembly of FIG. 9, showing movement of one sidewall member from a substantially planar, non assembled condition to a bowed, assembled condition.

To facilitate such hinged coupling, when the corresponding first set and second set of bracket members 42a, 42a' are engaged and intercoupled, a hinge rod 46 can be axially received through the coaxially aligned first and second hinge passages 43a, 43a' (FIGS. 7, 8 and 14). The diameter of the hinge rod 46, therefore, is substantially similar to that the longitudinal passages 43a, 43a' so as not to permit too much lateral movement between hinge passages and the hinge rod. The diameter of the rod 46, however, should not be too large so as to prevent or impede hinged movement of the corresponding bracket member about the first respective hinge axis 38a.

It will be appreciated that the corresponding longitudinal spacing or distance between adjacent bracket members 42a of the first set 41a, and that of the adjacent bracket members 42a' of the set 41a' is generally equal to the longitudinal length of the corresponding bracket member 42a', 42a to be alternately engaged and intercoupled in these respective longitudinal spaces therebetween. Accordingly, such relatively snug sliding receipt, and intercoupling, between the bracket members provides axial support, as well as lateral support, therebetween when the first and second hinge mechanisms 37a, 37b are assembled together.

As above mentioned, assembly of the bottom support 30 with the coupled first and second sidewall members 36, 36' is required to define the bottom of the container interior cavity 31, as well as provide vertical support to contain the growing medium therein. The bottom support 30, however, provides several other functions as well, such as partially defining the general curvilinear shape of sidewall support 27, via engaging contact with the sidewall members, bowing them toward their respective assembled condition. Accordingly, when the bottom support 30 is engaged against the sidewall members, the bottom support not only provides vertical support, but also provides lateral support and structural integrity to the container device 28.

The bottom support is preferably substantially circular, having a stepped peripheral edge 40 that engages the sidewall members 36, 36'. It will be appreciated, however, that the peripheral edge could be other curvilinear shapes as well, such as oval shaped.

The bottom support 30, as shown in FIGS. 7, 8, 14, 18 and 19, thus, is also preferably more structurally robust than the wire mesh design of the embodiments of FIGS. 1-5. As mentioned, the bottom support 30 must have sufficient structural integrity to vertically support the plant 21 and the growing medium in the container interior cavity, but have sufficient structural integrity to partially facilitate the shape definition of the container sidewall support 27.

Figure 20:
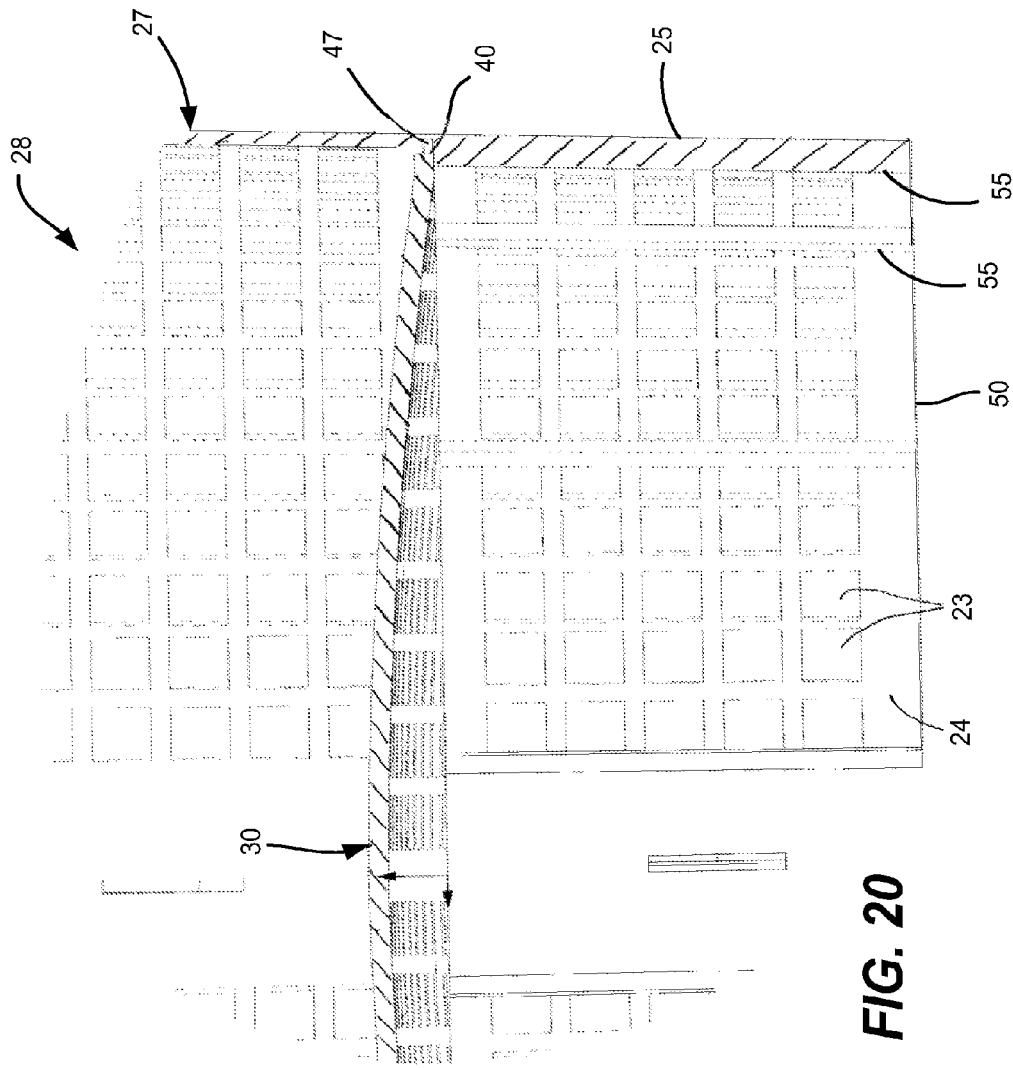
FIG. 20 is an enlarged, side elevation view, in cross-section, of the container assembly of FIG. 19, illustrating mounting of the bottom portion to the sidewall support.

In one particular embodiment, as shown in FIG. 20, the bottom support 30 is partially dome shaped, having a raised middle or central section and a lower outer peripheral edge 40. From the middle section to the outer peripheral edge 40, the interior wall of the bottom support 30 gradually slopes downwardly at the outer radial portions thereof. This configuration in beneficial in that greater structural strength is attained.

In another configuration, as shown in FIGS. 18 and 19, the bottom support 30 may incorporate a relatively uniform thickness domed top plate portion 44. This domed plate portion 44 provides the lattice framework that define the plurality of apertures therethrough. To provide additional lateral and vertical support, at two or more integral cross-support ribs 49 extend underneath the domed plate portion 44. Such cross-supports provide additional vertical support and structural strength.

To accommodate, support and mount the bottom support 30, the interior walls 24, 24' of the respective sidewall members 36, 36' define a receiving groove 47, 47' extending substantially linearly and horizontally thereacross when in the substantially planar, non-assembled condition. These opposed receiving grooves 47, 47', as shown in FIGS. 7, 8, 17 and 20, are further aligned with one another, and are sized and dimensioned for sliding receipt of the stepped peripheral edge 40 of the bottom portion, in a sliding, snap-fit manner, when oriented in the circular assembled condition.

The receiving grooves 47, 47' are preferably vertically oriented about one inch to about six inches from the bottom edges 50, 50' of the sidewall members 36, 36'. As mentioned above, the bottom support 30 is preferably raised a sufficient distance from the ground so as to provide room or a space beneath the bottom support 30 of the container device for the roots to air root prune. Moreover, by raising the bottom support, perched water is avoided.

As best illustrated in FIGS. 18 and 19, the circumferential or peripheral edge 40 may define two or more recesses 51 strategically oriented to accommodate the hinge mechanisms 37a, 37b that protrude into the interior cavity 31. As shown in one particular configuration, four recesses 51 are defined by the stepped peripheral edge 40 of the bottom support 30 that are equally spaced about 90° apart from the adjacent recess. Moreover, two or more finger holes 52 may also be included to facilitate gripping of the bottom support 30. In turn, assembly of the container device 28 is also facilitated, which will now be described in greater detail.

As previously indicated, assembly of the container device 28, when in the non-assembly condition of FIGS. 12 and 13, may commence by simply inserting the bottom support 30 into the interior cavity. If the container device 28 is substantially cylindrical-shaped, when in the assembled condition, insertion of the bottom support 30 may be easier from the bottom of the collapsed sidewall support 27 since this is the end closer to the receiving grooves 47, 47' then insertion from the opposite end thereof. However, if the container device 28 is substantially frustoconical, insertion of the bottom support 30 may be easier from the top of the collapsed sidewall support 27 this end is wider then the opposite side due to the taper of the sidewall members One particular assembly technique is to turn the bottom support 30 sideways, longitudinally aligning the elongated peripheral edge 40 with the elongated opening into the collapsed interior cavity 31 that is formed between the two opposed sidewall members 36, 36', in the non-assembled condition. Once a portion of the bottom support 30 is received in the elongated slit 53, the flexible sidewall members 36, 36' can commence bowing thereof. Simultaneously, the bottom support 30 can be slowly rotated in a manner coaxial aligning a longitudinal axis of the bottom support 30, with a longitudinal axis of the sidewall support 27, when in the assembled condition. As the engaging contact between the bottom support peripheral edge 40 and the interior walls 24, 24' of the sidewall members 36, 36' increases, bowing of the flexible sidewall members increasingly continues toward their semi-cylindrical shell shape or semi frustoconical shell shape. The hinge mechanisms 37a, 37b also simultaneously move from the closed condition (FIGS. 12 and 13), when the sidewall members 36, 36' are in the substantially planar, non-assembled condition, toward the opened position (FIGS. 7 and 8).

Contact of the peripheral edge 40 with the interior walls 24, 24' of the sidewall members continues as the bottom support is urged toward the receiving grooves 47, 47'. The recesses 51 of the peripheral edge 40 should be aligned to receive the protruding bracket members of the hinges so that they will not interfere with bottom support 30 during installation. Once the stepped peripheral edge 40 is snap-fit, peripherally received into the respective receiving grooves, installation of the bottom support 30 will be complete.

To provide additional vertical support to the bottom support mount, a plurality of upstanding rib members 55, 55' is provided, in one specific configuration, protruding and/or upstanding interiorly from the respective interior wall 24, 24' of the first and second sidewall members 36, 36' (FIGS. 7, 17 and 20). When the sidewall members 36, 36' are oriented in the assembled condition, thus, the rib members 55, 55' generally protrude from the respective interior walls 24, 24' radially inward. Each rib member 55, 55' further extends longitudinally along the respective sidewall interior wall 24, 24' from a lower portion thereof to an orientation terminating substantially at, or just below, the respective receiving grooves 47, 47'. In this manner, each rib member 55, 55' forms a respective support ledge 56, 56' for the bottom support 30 to seat against when the peripheral edge 40 is slideably received in the respective receiving grooves 47, 47'. Additional vertical support is thus provided as the bottom support 30 rests against these end ledges 56, 56' of the respective upstanding rib members 55, 55'.

Once the container device 28 is assembled, the thin moisture absorbent liner material 26 can be disposed juxtaposed the sidewall members 36, 36'. The liner material 26 may be disposed outside and juxtaposed to the container sidewall support 27, although it is preferably disposed on the inside of the container device, as well as against the bottom support 30 thereof if desired, wherein the lattice framework 22 can provide lateral support to the moist absorbent liner material when the growing medium is added to the interior cavity 31 of the container device 28.

In still another specific configuration, two absorbent liner materials 26 can be disposed substantially adjacent and juxtaposed to the sidewall support 27, an inner liner material 26 that is disposed adjacent the interior wall thereof, and an outer liner material 26 that is disposed adjacent the outer wall of the sidewall support 27. Collectively, these two absorbent liner materials straddle the lattice framework, forming an isolation or buffer airspace therebetween at each aperture, similar to double paned window concept. This configuration is beneficial in that the airspace partially isolates the inner liner material from direct exposure to the environment (especially direct sunlight). Moisture evaporation from the inner liner material is, thus, significantly decreased.

It will be appreciated, however, that the increased humidity created between two liner materials 26 in this buffer airspace, is not sufficient to prevent root desiccation, and thus air root pruning, as the root tip penetrates the inner liner material.

As will be understood, any sized container can be utilized to make up a plant container according to the selected plant size. It is understood that the plant will be removed from the container and moved to a larger container or planted into the landscape within a reasonable amount of time.

In one technique using the present invention, the root ball can be shifted to progressively larger container assembly, each of which incorporates the sidewall support and absorbent liner material in accordance with the present invention, as the plant and root ball grow. For example, a transplantable plant can be initially set in a smaller liner cell containing the properties of the present invention. As the plant increases in size, the root ball (with or without the older liner material) can be shifted to progressively larger container assembly (e.g., 1 gallon to 2 gallon to 3 gallon). This has been found to significantly create a fiborous root system free of root defects.

It will be further understood from the foregoing description that various modifications and changes may be made in the preferred and alternative embodiments of the present invention without departing from the its true spirit.

What is claimed is:

1. A bounding apparatus for a transplantable plant for bounding a growing medium in which the transplantable plant is grown comprising:
   a sheet-like lattice framework defining a plurality of spaced apertures; and
   a relatively thin, substantially moisture absorbent liner material disposed adjacent said lattice framework, said liner material being sufficiently penetrable to enable root penetration therethrough at said apertures, yet having sufficient structural integrity, when moist, to bound the growing medium and moisture across the spaced apertures of said lattice framework.

2. The bounding apparatus according to claim 1, wherein said sheet-like lattice framework defining a surface area, and having an interior wall and an opposed exterior wall, each said apertures extending from the interior wall to the exterior wall.

3. The bounding apparatus according to claim 2, further including:
   a second relatively thin, moisture absorbent liner material disposed adjacent the exterior wall of said lattice framework, said second liner material also being sufficiently penetrable to enable root penetration therethrough at said apertures.

4. The bounding apparatus according to claim 2, wherein said liner material being disposed adjacent to said interior wall of the framework.

5. The bounding apparatus according to claim 2, wherein said plurality of apertures of said lattice framework collectively defining an apertures area that comprises at least about 60% of said surface area.

6. The bounding apparatus according to claim 5, wherein said apertures area being at least about 80% of said surface area.

7. The bounding apparatus according to claim 6, wherein said apertures area being at least about 95% of said surface area.

8. The bounding apparatus according to claim 1, wherein said lattice framework being sufficiently flexible to resiliently bow from a substantially planar condition to a bowed condition.

9. The bounding apparatus according to claim 1, wherein a perimetric footprint of each of the apertures is selected from the group consisting essentially of a circle, a square, a rectangle, a diamond, and an oval.

10. The bounding apparatus according to claim 1, wherein said liner material includes one of organic paper and cellulose with a mixture of polyester fiber reinforcement material.

11. A bounding apparatus for a transplantable plant for bounding a growing medium in which the transplantable plant is grown comprising:
    a sidewall support including a sheet-like sidewall lattice framework having a sidewall surface area, and defining a plurality of relatively uniformly spaced sidewall apertures that collectively define a sidewall aperture area, said sidewall aperture area comprises at least about 60% to about 95% of said sidewall surface area; and
    a bottom support having a support surface area, and coupled to said sidewall support such that said sidewall support and said bottom support cooperate to define a cavity formed for receipt of the growing medium therein, said bottom support including a sheet-like bottom lattice framework defining a plurality of relatively uniformly spaced support wall apertures, extending through said bottom support from a respective interior wall to a respective exterior wall thereof, that collectively define a support wall aperture area, said support wall aperture area comprises at least about 60% to about 95% of said support surface area, said bottom support being vertically oriented at a location above the ground by a sufficient distance to promote and encourage air root pruning of the transplantable plant proximate said bottom support.

12. The bounding apparatus according to claim 11, wherein
    said sufficient distance is in the range of about one inch to about six inches.

13. The bounding apparatus according to claim 11, wherein
    said sidewall aperture area comprises at least about 80% to about 95% of said sidewall surface area, and said support wall aperture area comprises at least about 80% to about 95% of said support surface area.

14. The bounding apparatus according to claim 13, wherein
    a perimetric footprint of each of the apertures is selected from the group consisting essentially of a circle, a square, a rectangle, a diamond, and an oval.

15. The bounding apparatus according to claim 14, further including:
    a relatively thin, moisture absorbent liner material disposed adjacent said sidewall lattice framework, said liner material being sufficiently penetrable to enable root penetration therethrough at said sidewall apertures, yet having sufficient structural integrity, when moist, to bound the growing medium and moisture across the spaced apertures of said lattice framework.

16. The bounding apparatus according to claim 15, wherein
    said liner material being disposed adjacent to an interior wall of the sidewall lattice framework.

17. The bounding apparatus according to claim 16, wherein
    said liner material includes one of organic paper and cellulose with a mixture of polyester fiber reinforcement material.

18. A transplantable plant container assembly for containing a growing medium for a plant, said container assembly comprising:
    a circular-shaped bottom support having an interior wall, an opposed exterior wall, and a circular peripheral edge extending between the interior wall and exterior wall, said bottom support further defining a plurality of relatively uniformly spaced support wall apertures extending therethrough from interior wall to the exterior wall;
    a substantially planar first and second sidewall member, each having a respective interior wall and an opposed respective exterior wall, each said first and second sidewall member being comprised of a lattice framework defining a plurality of spaced sidewall apertures extending from the interior wall to the exterior wall, and each defining first end edges and opposed second end edges disposed adjacent one another; and a first hinge mechanism and a second hinge mechanism each hingeably coupling the corresponding first end edges of said first sidewall member and said second sidewall member to one another, and the corresponding second end edges of said first sidewall member and said second sidewall member to one another when said respective interior walls face one another in a substantially parallel manner, in a substantially planar, non-assembled condition;

wherein said first and second sidewall members are sufficiently flexible to resiliently bow from the substantially planar, non-assembled condition to a bowed, assembled condition, when the circular peripheral edge of the bottom support engages the respective interior walls, facilitating retainment of the sidewall members in the bowed, assembled condition, said first hinge mechanism and said second hinge mechanism both protrude interiorly inward from the respective interior walls.

19. The plant container assembly according to claim 18, wherein
said bottom support is coupled to said first and second sidewall members at a vertical location above the ground by a sufficient distance to promote and encourage air root pruning of the transplantable plant proximate said bottom support.

20. The plant container assembly according to claim 19, wherein
said sufficient distance is in the range of about one inch to about six inches.

21. The plant container assembly according to claim 18, wherein
said first and second sidewall members defining a collective receiving groove in the respective interior walls thereof, formed and dimensioned for sliding receipt of said circular peripheral edge when oriented in the assembled condition.

22. The plant container assembly according to claim 21, wherein
each said first and second sidewall member includes a plurality of upstanding support rib members, spaced apart along the respective interior wall, and extending longitudinally from a lower portion of said interior sidewall and terminating at said receiving groove in a manner providing vertical support to said bottom support when received in the receiving groove.

23. The plant container assembly according to claim 18, wherein
each said first and second sidewall member is trapezoid-shaped, in the substantially planar, non-assembled condition, such that in the bowed, assembled condition, said sidewall support is frustum-shaped.

24. The plant container assembly according to claim 23, wherein
said first hinge mechanism and said second hinge mechanism each includes a first set and second set of bracket members, said first set of bracket members of each hinge mechanism being disposed along the respective opposed end edges of said first sidewall member, and said second set of bracket members of each hinge mechanism being disposed along the respective opposed end edges of said second sidewall member, the opposed bracket members of each respective first set being spaced-apart from one another along the respective opposed end edge, and each corresponding bracket member defining a respective longitudinal passage extending therethrough, and coaxially aligned with one another along a respective first longitudinal axis, and the opposed bracket members of each second set also being spaced-apart from one another along the respective opposed end edges, and each corresponding bracket member defining a respective longitudinal passage extending therethrough, and coaxially aligned with one another along a respective second hinge axis, said respective bracket members of said respective first set and said bracket members of said second set of bracket members being off-set from one another enabling inter-coupling therebetween in a manner substantially co-axially aligning the respective first hinge axis of the respective first set of bracket members with the respective second hinge axis of the respective second set of bracket members; and a first and second hinge rod formed and dimensioned for sliding receipt through the respective aligned first and second hinge passages for respective hinged coupling therebetween;

wherein said first hinge mechanism and said second hinge mechanism substantially maintain hinged coupling during movement of the first and second sidewall members between the substantially planar, non-assembled condition and the bowed, assembled condition.

25. The plant container assembly according to claim 18, wherein
said plurality of relatively uniformly spaced sidewall apertures collectively define a sidewall aperture area that comprises at least about 60% to about 95% of a collective sidewall surface area of the first and second sidewall members, and said plurality of relatively uniformly spaced support apertures collectively define a support aperture area that comprises at least about 60% to about 95% of a collective support surface area of the bottom support.

26. The plant container assembly according to claim 25, wherein
a relatively thin, moisture absorbent liner material disposed adjacent said lattice framework, said liner material being sufficiently penetrable to enable root penetration therethrough at said apertures, yet having sufficient structural integrity, when moist, to bound the growing medium and moisture across the spaced apertures of said lattice framework.

27. The plant container assembly according to claim 26, wherein
said liner material being disposed adjacent to said interior wall of the framework.

28. The plant container assembly according to claim 26, wherein
said liner material is selected from the group consisting essentially of organic paper, cellulose and fiber material comprised at least partially of polyester.

29. The plant container assembly according to claim 26, further including:
a respective, relatively thin, moisture absorbent, bottom liner material disposed adjacent the interior wall of said bottom support, said bottom liner material also being sufficiently penetrable to enable root penetration therethrough at said support wall apertures.

30. The plant container assembly according to claim 25, wherein a perimetric footprint of each of the sidewall apertures is selected from the group consisting essentially of a circle, a square, a rectangle, a diamond, and an oval.

31. A method of promoting air root pruning at a sidewall support and a bottom support of a container device for the root system of a transplantable plant, said method comprising:

provliding a container device having a sidewall support including a sheet-like sidewall lattice framework defining a plurality of relatively uniformly spaced sidewall apertures that collectively define a sidewall aperture area, said sidewall aperture area comprises at least about 60% to about 95% of a total sidewall surface area of said sidewall support, said container device further including a bottom support having a sheet-like bottom lattice framework defining a plurality of relatively uniformly spaced support wall apertures that collectively define a support wall aperture area, said support wall aperture area comprises at least about 60% to about 95% of a total support wall surface area of said bottom support;

placing a root ball of a transplantable plant and growing medium into an interior cavity of the container device such that the growing medium substantially urges the liner material into supportive contact against interior wall and the lattice framework; and vertically positioning the bottom support of the container device at a location above the ground by a sufficient distance that creates an air space between the bottom lattice framework and the ground suitable to promote and encourage air root pruning of the transplantable plant proximate said bottom support.

32. The method according to claim 31, wherein said sufficient distance is in the range of about one inch to about six inches.

33. The method according to claim 32, wherein said vertically positioning the bottom support includes orienting the bottom support vertically along sidewall lattice framework at said location above the ground by said sufficient distance.

34. The method according to claim 31, wherein said providing a container device includes providing said sidewall aperture area that comprises at least about 80% to about 95% of said sidewall surface area, and providing said support wall aperture area that comprises at least about 80% to about 95% of said support wall surface area.

35. The method according to claim 31, further including:
disposing a relatively thin, substantially moisture absorbent liner material substantially adjacent to the interior wall and the lattice framework, said liner material being sufficiently penetrable to enable root penetration therethrough at said apertures, yet having sufficient structural integrity, when moist, to bound the growing medium and moisture across the spaced apertures of said lattice framework when contained in said cavity;

36. The method according to claim 35, further including:
moistening the liner material in a manner absorbing moisture.

* * * * *